US012292294B2

(12) United States Patent
Suzuki et al.

(10) Patent No.: US 12,292,294 B2
(45) Date of Patent: May 6, 2025

(54) VEHICLE TRAVEL ROUTE CONTROL SYSTEM, VEHICLE TRAVEL ROUTE CONTROL DEVICE, AND VEHICLE TRAVEL ROUTE CONTROL METHOD

(71) Applicant: Nissan Motor Co., Ltd., Yokohama (JP)

(72) Inventors: Masayasu Suzuki, Kanagawa (JP); Masahide Nakamura, Kanagawa (JP); Masaki Watanabe, Kanagawa (JP); Daisuke Saito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 574 days.

(21) Appl. No.: 17/442,671

(22) PCT Filed: Mar. 13, 2020

(86) PCT No.: PCT/IB2020/000272
§ 371 (c)(1),
(2) Date: Sep. 24, 2021

(87) PCT Pub. No.: WO2020/194062
PCT Pub. Date: Oct. 1, 2020

(65) Prior Publication Data
US 2022/0196416 A1 Jun. 23, 2022

(30) Foreign Application Priority Data
Mar. 27, 2019 (JP) .................. 2019-060131

(51) Int. Cl.
G01C 21/34 (2006.01)
B60W 60/00 (2020.01)
G06Q 50/40 (2024.01)

(52) U.S. Cl.
CPC ...... *G01C 21/3461* (2013.01); *B60W 60/00253* (2020.02); *B60W 60/0053* (2020.02); *G06Q 50/40* (2024.01); *B60W 2556/45* (2020.02)

(58) Field of Classification Search
CPC ............ G06Q 10/08355; G06Q 10/02; G06Q 10/047; G08G 1/202; G08G 1/123;
(Continued)

(56) References Cited

U.S. PATENT DOCUMENTS 7,698,061 B2 * 4/2010 Singh ................ G01C 21/3484
348/211.3
8,626,565 B2 * 1/2014 Petroff ................ G05D 1/0221
705/7.35
(Continued)

FOREIGN PATENT DOCUMENTS

CN 109389276 A 2/2019
JP 2003-139549 A 5/2003
(Continued)

*Primary Examiner* — Steven B Theriault
(74) *Attorney, Agent, or Firm* — Global IP Counselors, LLP

(57) ABSTRACT

A vehicle travel route control system controls a plurality of vehicles having an autonomous driving function or a driving assist function, wherein a vehicle dispatch information data server creates a travel route map, in which driving mode switching position at which vehicles have switched over during travel to the manual driving mode from the autonomous driving mode, have been added to a road map. Based on the travel route map, a travel route that avoids the driving mode switching position is calculated from among a plurality of routes on which a dispatch vehicle candidate travels to a destination via user position. When a travel route that avoids the driving mode switching position is calculated, a dispatch vehicle candidate is set as a dispatch vehicle, and (Continued)

the calculated travel route information is transmitted to an on-board unit mounted in the dispatch vehicle.

21 Claims, 13 Drawing Sheets

(58) Field of Classification Search
CPC ...... G08G 1/13; G08G 1/20; G08G 1/096844;
G08G 1/0969; G08G 1/144; G08G
1/096827; G08G 1/096816; G08G
1/096708; B60W 40/08; B60W 2556/50;
B60W 40/04; G01C 21/3438; G01C
21/3415; G01C 21/343; G01C 21/34;
G01C 21/26; G01C 21/3676; G01C
21/3605; G01C 21/3446; G05D 1/0027;
G05D 1/0287; G05D 1/0297; G05D
1/0223

See application file for complete search history.

(56) References Cited

U.S. PATENT DOCUMENTS

| | | | | |
|---|---|---|---|---|
| 9,547,307 | B1* | 1/2017 | Cullinane | G01C 21/3667 |
| 9,613,386 | B1* | 4/2017 | Arden | G01C 21/3438 |
| 9,688,288 | B1* | 6/2017 | Lathrop | G05D 1/0061 |
| 9,715,233 | B1* | 7/2017 | Mandeville-Clarke | H04L 67/53 |
| 9,921,070 | B1* | 3/2018 | Nimchuk | G01C 21/3679 |
| 10,089,872 | B1* | 10/2018 | Beaurepaire | G08G 1/143 |
| 10,324,463 | B1* | 6/2019 | Konrardy | G01S 19/39 |
| 10,449,970 | B2* | 10/2019 | Urano | B60W 50/14 |
| 10,451,428 | B2* | 10/2019 | Lathrop | G01C 21/3676 |
| 10,584,971 | B1* | 3/2020 | Askeland | G01C 21/3859 |
| 10,775,788 | B2* | 9/2020 | Kim | B60R 25/23 |
| 10,895,465 | B2* | 1/2021 | Shimizu | G01C 21/3484 |
| 10,989,550 | B2* | 4/2021 | Cha | G01C 21/3469 |
| 10,990,829 | B2* | 4/2021 | Cameron | G06T 7/579 |
| 11,010,998 | B1* | 5/2021 | Dolgov | B60T 8/17 |
| 11,397,089 | B2* | 7/2022 | Nagy | G01C 21/3415 |
| 11,473,923 | B2* | 10/2022 | Matsushita | G10L 13/027 |
| 2002/0120396 | A1* | 8/2002 | Boies | G06Q 10/047 340/995.19 |
| 2010/0256836 | A1* | 10/2010 | Mudalige | G08G 1/22 701/25 |
| 2014/0277902 | A1* | 9/2014 | Koch | G07C 5/008 701/29.1 |
| 2015/0112537 | A1* | 4/2015 | Kawamata | G05D 1/0274 701/23 |
| 2015/0242944 | A1* | 8/2015 | Willard | G06Q 10/02 705/5 |
| 2015/0362324 | A1* | 12/2015 | Jin | G01C 21/3469 701/123 |
| 2017/0059336 | A1* | 3/2017 | Huang | G05D 1/0297 |
| 2017/0102700 | A1* | 4/2017 | Kozak | B60W 30/00 |
| 2017/0123419 | A1 | 5/2017 | Levinson et al. | |
| 2017/0123421 | A1* | 5/2017 | Kentley | G01C 21/26 |
| 2017/0193627 | A1* | 7/2017 | Urmson | G06Q 10/063114 |
| 2017/0262790 | A1* | 9/2017 | Khasis | G08G 1/012 |
| 2017/0303842 | A1* | 10/2017 | Yoshida | B60W 50/14 |
| 2017/0313323 | A1* | 11/2017 | Tseng | B60W 50/082 |
| 2017/0316697 | A1* | 11/2017 | Tulabandhula | G08G 1/202 |
| 2017/0364070 | A1* | 12/2017 | Oba | G05D 1/81 |
| 2017/0370740 | A1* | 12/2017 | Nagy | G01C 21/3484 |
| 2018/0003518 | A1* | 1/2018 | Hoareau | G01C 21/3484 |
| 2018/0004211 | A1* | 1/2018 | Grimm | G06Q 10/047 |
| 2018/0017398 | A1* | 1/2018 | McNew | G01C 21/3453 |
| 2018/0023966 | A1 | 1/2018 | Iwai et al. | |
| 2018/0081374 | A1* | 3/2018 | Nimchuk | G06Q 10/08355 |
| 2018/0143643 | A1* | 5/2018 | Fairfield | G01C 21/3667 |
| 2018/0148071 | A1* | 5/2018 | Kim | A61B 5/18 |
| 2018/0189323 | A1* | 7/2018 | Wheeler | G01C 21/3881 |
| 2018/0218758 | A1* | 8/2018 | Maeda | G07C 5/0866 |
| 2018/0314252 | A1* | 11/2018 | Asakura | G01C 21/3629 |
| 2018/0361972 | A1* | 12/2018 | Zagorski | B60W 30/182 |
| 2019/0004516 | A1* | 1/2019 | Liu | G05D 1/0088 |
| 2019/0025842 | A1* | 1/2019 | Kim | G05D 1/0061 |
| 2019/0042996 | A1 | 2/2019 | Watanabe et al. | |
| 2019/0064843 | A1* | 2/2019 | Matsui | G05D 1/0212 |
| 2019/0066516 | A1* | 2/2019 | Kuhara | G05D 1/0016 |
| 2019/0108539 | A1* | 4/2019 | Watanabe | G06Q 30/0207 |
| 2019/0111925 | A1* | 4/2019 | Sata | B60W 10/30 |
| 2019/0113353 | A1* | 4/2019 | Shimizu | B60W 50/082 |
| 2019/0180628 | A1* | 6/2019 | Hayashi | G06Q 10/083 |
| 2019/0186936 | A1* | 6/2019 | Ebner | G01C 21/3822 |
| 2019/0197648 | A1* | 6/2019 | Arakawa | G06Q 50/40 |
| 2019/0204097 | A1* | 7/2019 | Starns | G05D 1/228 |
| 2019/0212731 | A1* | 7/2019 | Flynn | B60W 40/09 |
| 2019/0265703 | A1* | 8/2019 | Hicok | G05D 1/249 |
| 2019/0266815 | A1* | 8/2019 | Andrade | B60W 40/02 |
| 2019/0303806 | A1* | 10/2019 | Namba | G06Q 50/40 |
| 2019/0304043 | A1* | 10/2019 | Nakamura | G08G 1/202 |
| 2020/0164895 | A1* | 5/2020 | Boss | B60W 50/082 |
| 2020/0189617 | A1* | 6/2020 | Takada | G01C 21/34 |
| 2020/0193549 | A1* | 6/2020 | Pedersen | G06Q 50/40 |
| 2020/0198658 | A1* | 6/2020 | Suzuki | G01C 21/3617 |
| 2021/0264783 | A1* | 8/2021 | Suzuki | H04N 23/90 |
| 2022/0204050 | A1* | 6/2022 | Taveira | G01C 21/3423 |
| 2022/0276066 | A1* | 9/2022 | Beaurepaire | G01C 21/3492 |

FOREIGN PATENT DOCUMENTS

| | | |
|---|---|---|
| JP | 2016-115364 A | 6/2016 |
| JP | 2017-151041 A | 8/2017 |
| JP | 2019-32664 A | 2/2019 |
| WO | 2016/002527 A1 | 1/2016 |
| WO | 2018/230691 A1 | 12/2018 |

* cited by examiner

VEHICLE TRAVEL ROUTE CONTROL SYSTEM, VEHICLE TRAVEL ROUTE CONTROL DEVICE, AND VEHICLE TRAVEL ROUTE CONTROL METHOD

CROSS-REFERENCE TO RELATED APPLICATIONS

This application is a U.S. national stage application of International Application No. PCT/IB2020/000272, filed on Mar. 13, 2020, which claims priority to Japanese Patent Application No. 2019-060131, filed on Mar. 27, 2019.

BACKGROUND

Technical Field

The present disclosure relates to a vehicle travel route control system, a vehicle travel route control device, and a vehicle travel route control method, which are applied to a vehicle dispatch service and manage a travel route of a dispatch vehicle.

Background Information

Driving assist devices and centers that enable more reliable assistance for driving vehicles that carry out autonomous driving are known from the prior art (for example, refer to Japanese Laid-Open Patent Application No. 2017-151041—Patent Document 1). This conventional device is used in an autonomous driving vehicle in which switching between the execution and the non-execution of autonomous driving depends upon changes in the detection performance of sensors, such as a GNSS receiver, an inertial sensor, a peripheral sensor, and the like, and are sequentially transmitted from the center. It includes an information acquisition unit that sequentially acquires autonomous driving traffic volume, which is the amount of traffic of vehicles that are able to execute autonomous driving, and a route search unit that searches for a recommended route when autonomous driving is executed. When the route search unit selects a recommended route from a plurality of selectable roads, based on the autonomous driving traffic volume acquired by the information acquisition unit, priority is given to those roads that have a heavier traffic volume of vehicles that are able to execute autonomous driving.

SUMMARY

The driving assist device disclosed in Japanese Laid-Open Patent Application No. 2017-151041 preferentially selects roads that have a heavier traffic volume of vehicles that are able to execute autonomous driving for the recommended route. However, a road that has a heavier traffic volume of vehicles that are able to execute autonomous driving does not necessarily mean that the road has a light traffic volume of autonomous driving vehicles that have been switched over to manual driving mode. Thus, during travel on the selected recommended route in an autonomous driving mode, there is a high probability that the mode has been switched over to the manual driving mode. As a result, when a plurality of dispatch vehicles are centrally managed, a control operator would not be able to know which dispatch vehicle should be watched and when; thus, there is the problem that the system monitoring load cannot be reduced.

The object of the present disclosure is to reduce the system monitoring load by calculating the route that improves travel route completion reliability, when a plurality of dispatch vehicles are centrally managed.

In order to achieve the object described above, the present disclosure relates to a vehicle travel route control system that controls a plurality of vehicles having an autonomous driving function or a driving assist function, comprising a user terminal that sends a dispatch request to a destination, a vehicle dispatch controller that, when the dispatch request is received, extracts a dispatch vehicle candidate from among the plurality of vehicles and calculates a travel route for the dispatch vehicle candidate, and an on-board terminal that receives travel route information of the dispatch vehicle candidate calculated by the vehicle dispatch controller. The vehicle dispatch controller creates a travel route map, in which information regarding driving mode switching position at which vehicles during travel have switched over to manual driving mode from autonomous driving mode, that is, the driving mode realized by use of the autonomous driving function or the driving assist function of the vehicle, have been added to a road map. Based on the travel route map and position information of the dispatch vehicle candidate at the extracted timing, a travel route that avoids the driving mode switching position is calculated from among a plurality of routes along which the dispatch vehicle candidate may travel to the destination via a boarding location. When a travel route that avoids the driving mode switching position is calculated, the dispatch vehicle candidate for which the travel route could be calculated is set as the dispatch vehicle, and the calculated travel route information is transmitted to the on-board terminal mounted in the dispatch vehicle.

Thus, when a plurality of dispatch vehicles are centrally managed, the system monitoring load can be reduced by using route calculations that improve travel route completion reliability.

BRIEF DESCRIPTION OF THE DRAWINGS

Referring now to the attached drawings which form a part of this original disclosure.

DETAILED DESCRIPTION OF EMBODIMENTS

Figure 1:
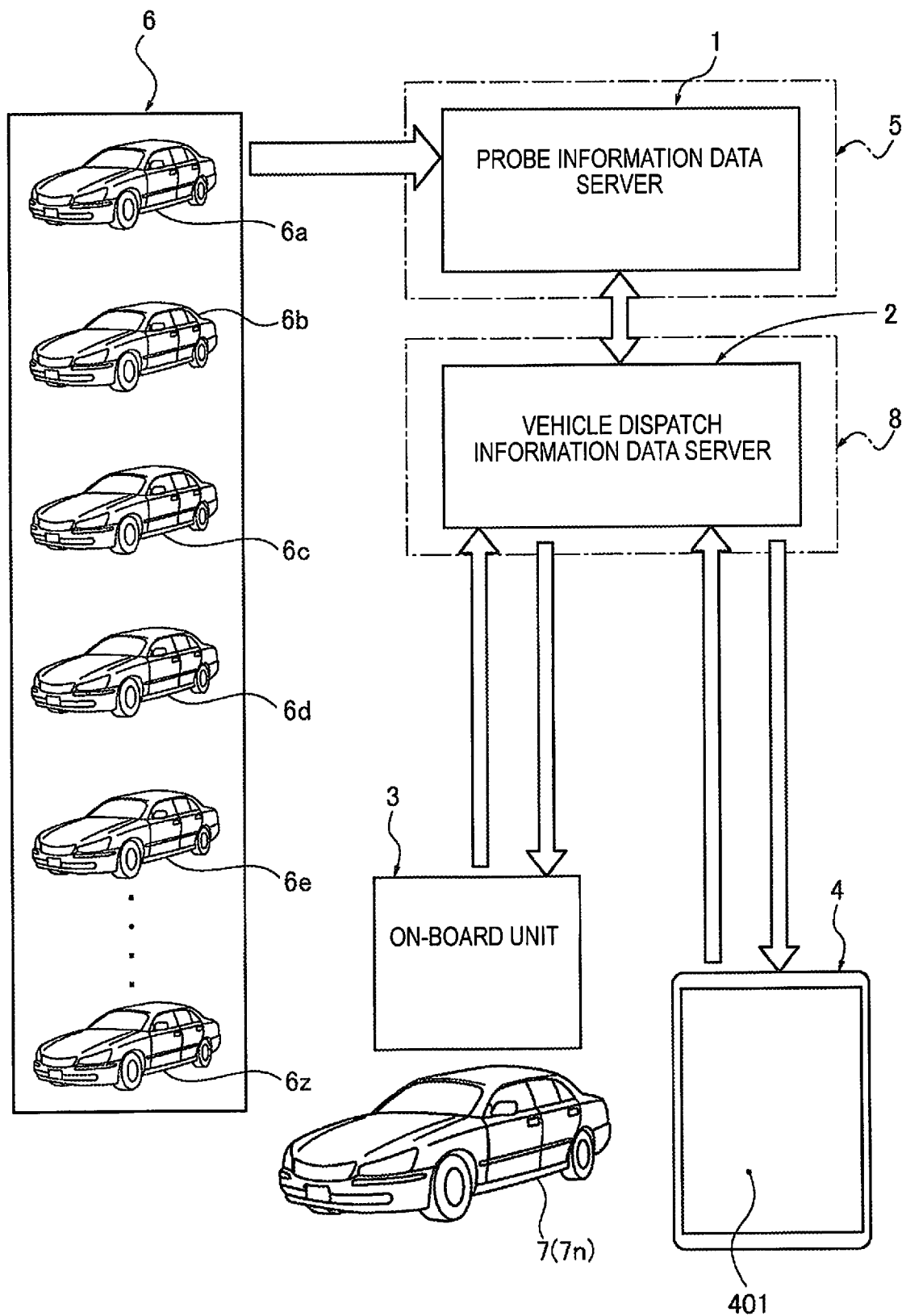
FIG. 1 is a network configuration diagram illustrating the overall configuration of a vehicle dispatch information network to which is applied a vehicle travel route control system, a vehicle travel route control device, and vehicle travel route control method according to a first embodiment.

Embodiments for implementing the vehicle travel route control system, the vehicle travel route control device, and the vehicle travel route control method according to the present disclosure will be described below based on the first and second embodiments illustrated in the drawings.

First Embodiment

The vehicle travel route control system, the vehicle travel route control device, and the vehicle travel route control method according to a first embodiment are applied to a vehicle dispatch information network which manages a plurality of dispatch vehicles (manned/unmanned autonomous driving vehicles) belonging to a taxi service, a rental car service, a car sharing service, etc. The "overall system configuration," "detailed configuration of a vehicle dispatch information data server," "detailed configuration of an on-board unit," and the "detailed configuration of a mobile terminal" will be described separately below, with respect to the configuration of the first embodiment.

[Verall System Configuration (FIG. 1)]

FIG. 1 shows the overall configuration of a vehicle dispatch information network to which is applied a vehicle travel route control system, a vehicle travel route control device, and vehicle travel route control method according to the first embodiment. The overall system configuration of the vehicle dispatch information network will be described below with reference to FIG. 1.

As shown in FIG. 1, the vehicle dispatch information network includes a probe information data server 1, a vehicle dispatch information data server 2 (vehicle dispatch controller), an on-board unit 3 (on-board terminal), and a mobile terminal 4 (user terminal). These information devices exchange information by using mutual wireless communication.

The probe information data server 1 utilizes each vehicle as a sensor in order to collect a vast amount of probe data, and is installed in a vehicle information management center 5 in a probe information system that enables sharing of various information. In this probe information data server 1, numerous probe vehicles 6a, 6b, 6c, 6d, 6e . . . 6z constitute a probe vehicle group 6, and a vast amount of vehicle information that is periodically transmitted from each vehicle that constitutes the probe vehicle group 6 is received. The vehicle information received from the probe vehicle group 6 is then classified according to vehicle type (autonomous driving vehicles and other vehicles), information usage type, date, time of day, and the like, for example, and is stored while being updated as vehicle information data.

The vehicle dispatch information data server 2 is installed in a vehicle dispatch management center 8 that centrally manages the vehicle dispatch information network, in a vehicle dispatch information network in which a plurality of dispatch vehicles 7n are the target of vehicle dispatch service management. This vehicle dispatch information data server 2 has a function for utilizing a part of the vast amount of vehicle information data stored in the probe information data server 1 in order comprehensively to manage travel routes and boarding/deboarding/stopping positions of the plurality of dispatch vehicles 7n belonging to the vehicle dispatch service. When travel routes are managed, for example, when a vehicle dispatch request is received from the mobile terminal 4, a route is calculated which avoids driving mode switching positions at which the probe vehicle group 6 was switched from autonomous driving mode to manual driving mode, as the travel route of the dispatch vehicle candidate to the destination. Then, when the calculation of the travel route is successful, the dispatch vehicle candidate for which route calculation succeeded is set as a dispatch vehicle 7, and travel route information which instructs the dispatch vehicle 7 to travel in accordance with the calculated travel route is transmitted to the on-board unit 3.

The on-board unit 3 is mounted in each of the plurality of dispatch vehicles 7n, which have an autonomous driving function realized by using manned or unmanned autonomous driving vehicles (driverless autonomous driving vehicles), and which are managed by the vehicle dispatch information data server 2. When travel route information is received from the vehicle dispatch information data server 2, this on-board unit 3 carries out a control to cause the dispatch vehicle 7 to travel in accordance with the travel route. In addition, when the dispatch vehicle 7 receives a remote control intervention signal from the vehicle dispatch information data server 2, the on-board unit carries out a control to cause the dispatch vehicle 7 to detour in accordance with the received remote control intervention signal or to stop the dispatch vehicle 7 in accordance with a stop instruction.

The mobile terminal 4 is a mobile information terminal that is operated by numerous users who receive the vehicle dispatch service through the vehicle dispatch information network. In this mobile terminal 4, during travel to a destination using a dispatch vehicle, a dispatch request to the destination is transmitted to the vehicle dispatch information data server 2 by using a user input operation. In response to this dispatch request, a travel route and boarding/deboarding points that meet the request conditions are calculated in the vehicle dispatch information data server 2, and the calculation result is transmitted to the mobile terminal 4. Then, the mobile terminal 4 that has received the calculation result from the vehicle dispatch information data server 2 displays (road map display, message display, etc.) the calculation result on a display screen 401.

Figure 2:
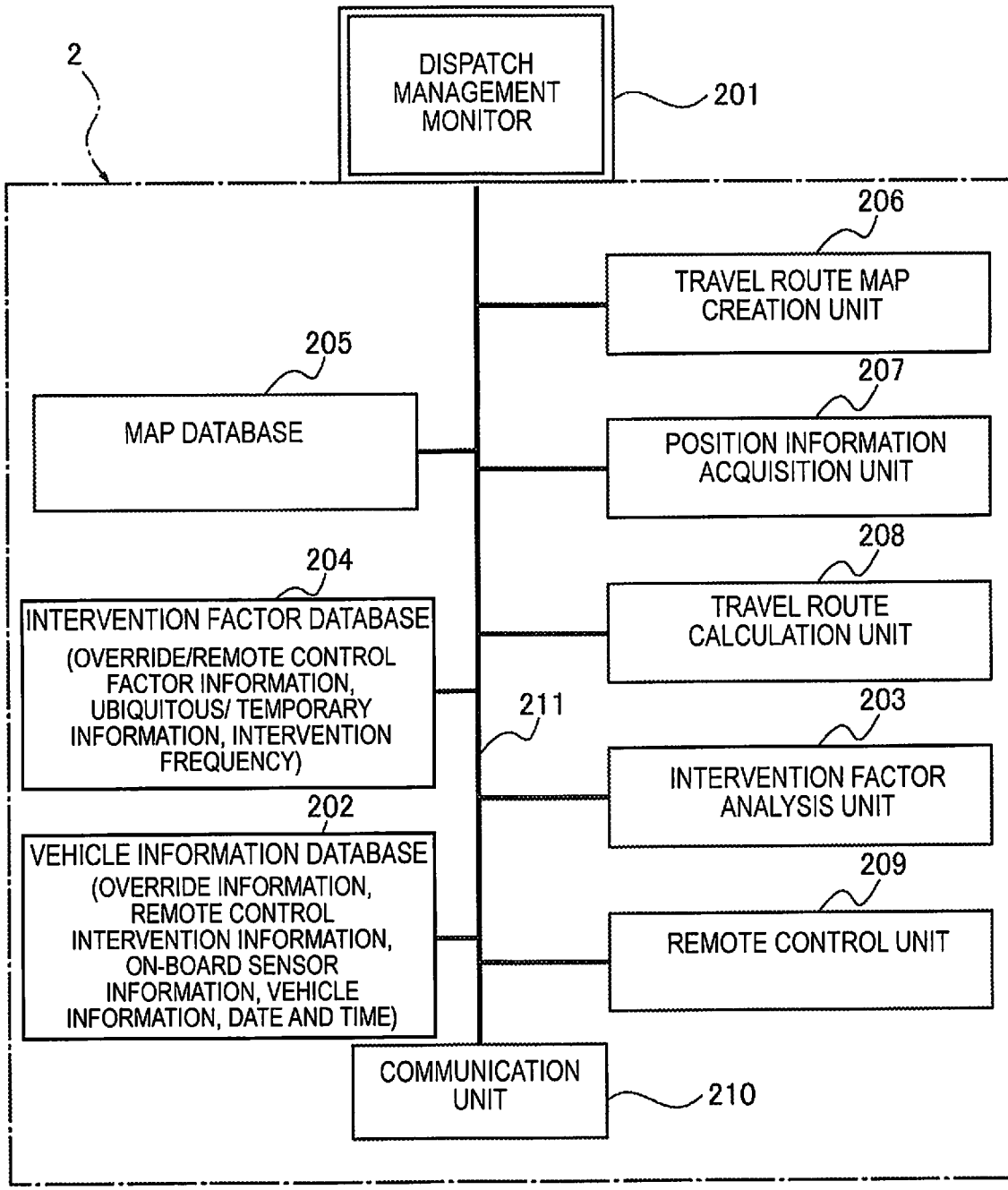
FIG. 2 is a block diagram illustrating the configuration of a vehicle dispatch information data server provided in a vehicle dispatch management center in the vehicle travel route control system.
Figure 3:
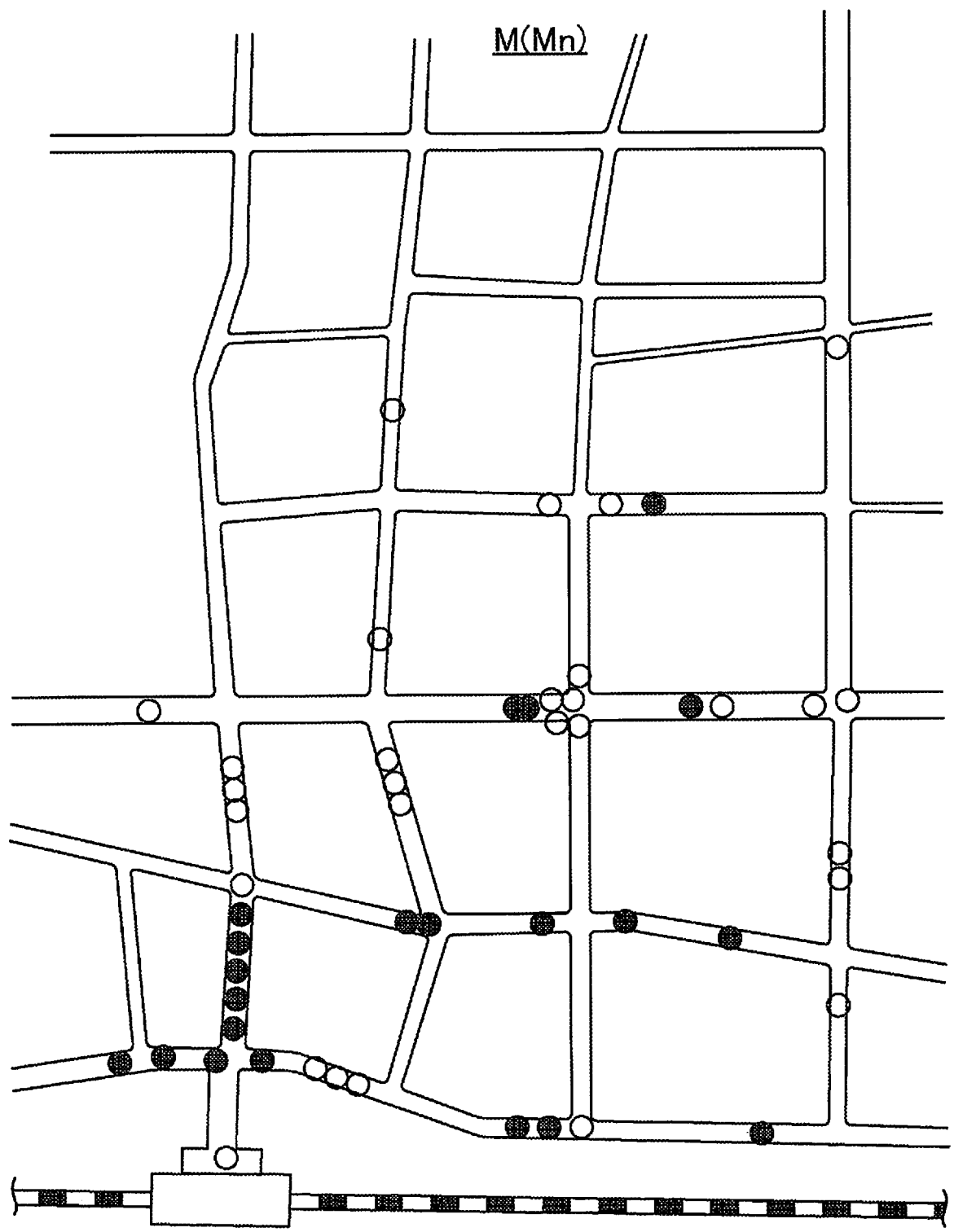
FIG. 3 is a diagram of a map illustrating one example of a travel route map used for calculating a travel route in a travel route calculation unit.

Detailed Configuration of the Vehicle Dispatch Information Data Server (FIGS. 2, 3)

FIG. 2 shows the configuration of the vehicle dispatch information data server 2 provided in the vehicle dispatch management center 8 in the vehicle travel route control system. The detailed configuration of the vehicle dispatch information data server 2 will be described below with reference to FIG. 2.

The vehicle dispatch information data server 2 has a dispatch management monitor 201, a vehicle information database 202, an intervention factor analysis unit 203, an intervention factor database 204, and a map database 205. In addition, a travel route map creation unit 206, a position information acquisition unit 207, a travel route calculation unit 208, a remote control unit 209, and a communication unit 210 are included. The constituent elements of the vehicle dispatch information data server 2 are interconnected so as to be capable of exchanging information by using a CAN communication cable 211, etc.

The dispatch management monitor 201 has a monitor screen that is watched by a control operator who monitors the system of the vehicle dispatch information network in the vehicle dispatch management center 8. The control operator monitors the travel situations and the surrounding conditions of the plurality of dispatch vehicles 7*n* while viewing the monitor screen, and, for example, if there is the dispatch vehicle 7 that is switched from the autonomous driving mode to the manual driving mode, creates a remote control intervention signal, such as for changing the travel route of the dispatch vehicle 7, by using input to the remote control unit 209.

The vehicle information database 202 receives vehicle information data by using a request to the probe information data server 1. Then, from among the received vehicle information data, override information (=information related to driving mode switching positions) regarding numerous autonomous driving vehicles switching from the autonomous driving mode to the manual driving mode is extracted and stored. Here, "override" means that during travel in the autonomous driving mode, at least one of the following driver operations has intervened: an accelerator pedal operation, a braking operation, or a steering operation. Then, when there is an intervening driver operation during travel in the autonomous driving mode, the driving mode is switched from the autonomous driving mode to the manual driving mode. In addition to override information, remote control input information, on-board sensor information, vehicle information, date and time, and the like, are also stored in the vehicle information database 202.

Based on the information stored in the vehicle information database 202, the intervention factor analysis unit 203 analyzes the intervention factors that caused the switch from the autonomous driving mode to the manual driving mode. The intervention factor analysis unit 203 analyzes the following, based on the driving mode switching positions of the override information.

Frequency of occurrence by intervention type (accelerator pedal/brake/steering) is analyzed.

Occurrence area by intervention type (accelerator pedal/brake/steering) is calculated.

Cause of occurrence of an override is estimated using on-board sensor information, and whether the cause is a "ubiquitous event" due to location, date and time, and the like, or a temporary "unexpected event" is analyzed.

Here, a "ubiquitous event" is an event in which it is likely that overriding would be repeated many times due to location, date and time, etc. Examples include cases such as travel between buildings where the GPS accuracy is low, travel during the late afternoon sun (into the light) when traffic lights and stop lines could be misidentified, and travel through a road construction area for a fixed distance.

An "unexpected event" is a temporary occurrence due to an obstacle, etc., where repeated overrides would be unlikely. Examples include the sudden darting out of a person or a vehicle, or the presence of a parked vehicle or an obstacle on the travel route that can be avoided by using a manual steering operation.

The intervention factor database 204 stores intervention factor information for each driving mode switching position based on the vehicle information database 202 and the intervention factor analysis results by using the intervention factor analysis unit 203. Examples of the information stored in the intervention factor database 204 are override/remote control factor information, ubiquitous/temporary information, and intervention frequency. Specific examples of the stored intervention factor information are listed below.

Some type of operational intervention+position information

Here, it is assumed, for example, that at the time of some type of operational intervention involving the accelerator pedal/brake/steering, there is variability in the position information when the provided travel route and the position information are compared, or when position information from two points in time are compared. For such cases, the analysis result of "low GPS accuracy" is stored in the intervention factor database 204 together with the date and time (weekday/holiday), and time of day information.

Accelerator operation intervention+camera image

Here, it is assumed, for example, that a traffic light is pictured in a front camera image at the time of an accelerator operation intervention. For such cases, the analysis result of "traffic signal could not be recognized" is stored in the intervention factor database 204 together with the date and time (weekday/holiday), and time of day information.

Braking operation intervention+front camera image or forward obstacle sensor

Here, it is assumed, for example, that the sudden darting out of a person or a vehicle is determined from on-board sensor information at the time of a braking operation intervention. For such cases, the analysis result of "darting out of a person or a vehicle" is stored in the intervention factor database 204 together with the date and time (weekday/holiday), and time of day information.

Steering operation intervention+front camera image or forward obstacle sensor

Here, it is assumed, for example, that it is determined that a fallen object (for example, a piece of wood) on the road was avoided from the on-board sensor information at the time of a steering operation intervention. For such cases, the analysis result of "stationary obstacle" is stored in the intervention factor database 204 together with the date and time (weekday/holiday), and time of day information.

Remote control intervention

Here, it is assumed, for example, that there is a remote control intervention caused by alternating traffic due to construction work. For such cases, the result of "alternating traffic due to construction" derived from image recognition or input by an observer is stored in the intervention factor database 204 together with the date and time (weekday/holiday), and time of day information.

In addition, whether these analysis results are "ubiquitous events" due to location, date and time, and the like, or temporary "unexpected events," is analyzed and stored in the intervention factor database 204.

A map database 205 stores so-called electronic map data, in which latitude and longitude is associated with road map information. For example, during travel to a destination utilizing a dispatch vehicle, when a user carries out an input operation with the mobile terminal 4, road map information including the user position detected by a GPS 402 of the mobile terminal 4, the boarding location, and the current location of the dispatch vehicle candidate is sent to the travel route map creation unit 206. Here, the "current location of the dispatch vehicle candidate" is the position information of the dispatch vehicle candidate at the timing at which the dispatch vehicle candidate is extracted from the plurality of dispatch vehicles 7n.

The travel route map creation unit 206 adds the driving mode switching positions to the road map to create a travel route map M based on the vehicle information database 202, the intervention factor database 204, and the map database 205. Here, in the travel route map M, the driving mode switching positions that are added to the road map are written so that it is possible to identify whether the driving mode switching position is due to a "ubiquitous event" or an "unexpected event."

FIG. 3 shows one example of the travel route map M. A driving mode switching position due to a "ubiquitous event" is marked with ● and a driving mode switching position due to an "unexpected event" is marked with ○. The travel route map M is a road map to which the driving mode switching positions are added by using ● and ○ marks, and, in particular, a location where there is a concentration of driving mode switching positions due to a "ubiquitous event" is a group of points made up of a concentration of ● marks. In addition, a location where there is a concentration of driving mode switching positions due to an "unexpected event" is a group of points made of a concentration of ○ marks. Thus, when the travel route map M is created with groups of points clearly marked, it becomes possible to recognize those locations in the travel route as areas to be avoided.

In addition, in the vehicle information database 202, information regarding the driving mode switching positions, at which a large number of autonomous driving vehicles switched from the autonomous driving mode to the manual driving mode, is acquired along with date and time information, including weekday/holiday and time of day. Thus, when the driving mode switching positions and date and time information are acquired, the travel route map M creates a plurality of travel route maps Mn in which the driving mode switching positions are added to the road map, separated by weekday/holiday and time of day. The reason for this is that there is a different between traffic volume and traffic flow for weekdays and holidays, and the influence of the afternoon sun varies with time of day, so that a different travel route map M can be drawn up depending on the date and time information.

When a dispatch request is received from the mobile terminal 4, the position information acquisition unit 207 acquires the position information of the destination, determines a dispatch vehicle candidate from a plurality of dispatch vehicles 7n, and acquires the position information of the current location of the determined dispatch vehicle candidate. Here, when the location of the mobile terminal 4 is different from the current position of the dispatch vehicle candidate, the location information of the mobile terminal 4 (=location information of the user) and the boarding location information are also acquired. When the dispatch vehicle candidate is determined from a plurality of dispatch vehicles 7n, a vehicle for which a travel route can be calculated from the relationship between the destination and the user position is selected as the dispatch vehicle candidate. Then, when there is a plurality of dispatch vehicle candidates, the plurality of dispatch vehicle candidates are prioritized based on the proximity of the dispatch vehicle candidate to the user, i.e., the shortness of the pickup distance.

When the current location, the user position, and the position information of the destination are acquired, the travel route calculation unit 208 references the travel route map M and calculates, from among a plurality of routes that pass from the current location to the destination via the boarding location, a route that avoids the driving mode switching positions, as the travel route of the dispatch vehicle candidate. Then, when the calculation of the travel route that avoids the driving mode switching positions is successful, the dispatch vehicle candidate for which the route calculation succeeded is set as the dispatch vehicle 7.

Here, when the travel route is computed by using the travel route calculation unit 208, if the calculation of a travel route that avoids the driving mode switching positions is not successful, the travel route map M that has intervention factor information is referenced, and a route that avoids driving mode switching positions due to "ubiquitous events" is calculated as the travel route of the dispatch vehicle candidate. That is, of the driving mode switching positions, a travel route that avoids the driving mode switching positions due to "ubiquitous events" (● marks) but that allows the presence of the driving mode switching positions due to "unexpected events" (○ marks) is calculated.

In addition, the travel route calculation unit 208 acquires the current location of the dispatch vehicle candidate and the location information of the destination along with date and time information, including weekday/holiday and time of day. Then, when the travel route is calculated, the travel route map M that corresponds to the date and time information is selected from among the plurality of travel route maps Mn, and the selected travel route map M is referenced.

In addition, when the calculation of the travel route of the dispatch vehicle candidate is successful, the travel route calculation unit 208 draws the travel route on the road map and creates a travel route information display image with a message showing the result of the mode switch factor analysis. This travel route information display image is transmitted to the mobile terminal 4 and the on-board unit 3 of the dispatch vehicle 7.

When the control operator of the vehicle dispatch management center 8 monitors the travel situation and the surrounding conditions of the dispatch vehicle 7 by using the dispatch management monitor 201 and determines that the dispatch vehicle 7 cannot maintain the autonomous driving, the remote control unit 209 creates remote control intervention signals, such as for changing the travel route. The created remote control intervention signals are transmitted to the on-board unit 3 via the communication unit 210, and the dispatch vehicle 7 is instructed to change the travel route or to stop, for example.

The communication unit 210 transmits and receives an exchange of information between the vehicle dispatch information data server 2 and the mobile terminal 4, or between the vehicle dispatch information data server 2 and the on-board unit 3. Here, the communication unit 210 receives a dispatch request from the mobile terminal 4. Then, on-board sensor information and vehicle information from the on-board unit 3 are received.

In addition, when the travel route of the dispatch vehicle 7 is calculated, the communication unit 210 sends an instruction to the on-board unit 3 for the dispatch vehicle 7 to travel along the travel route. In addition, when the travel route of the dispatch vehicle 7 is calculated, the communication unit 210 sends an instruction for the on-board unit 3 and the mobile terminal 4 to display the road map on which the travel route has been drawn and the mode switch factor analysis result message.

Examples of messages that are displayed include "GPS accuracy is low during this time of day," "the recognition accuracy for this traffic light is low during this time of day," "this location will be avoided due to the sudden appearance of pedestrians or cars," "this location will be avoided because there may be obstacles on the road," "this location will be avoided because of alternating traffic due to construction," and "this route reliably supports continued autonomous driving."

Figure 4:
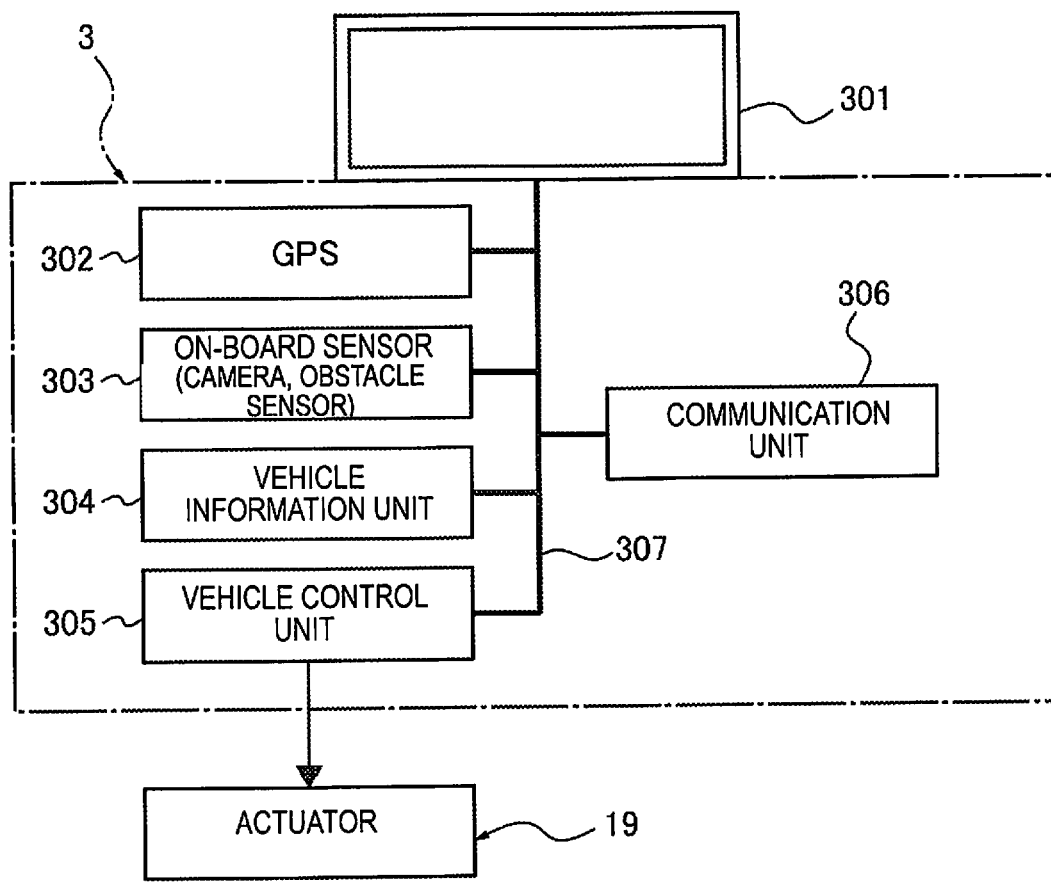
FIG. 4 is a block diagram illustrating the configuration of an on-board unit (on-board terminal) mounted in a dispatch vehicle in the vehicle travel route control system.

Detailed Configuration of the On-Board Unit (FIG. 4)

FIG. 4 shows the configuration of the on-board unit 3 in the vehicle travel route control system. The detailed configuration of the on-board unit 3 will be described below with reference to FIG. 4.

The on-board unit 3 includes a display monitor 301, a GPS 302, an on-board sensor 303, a vehicle information unit 304, a vehicle control unit 305, and a communication unit 306. The constituent elements of the on-board unit 3 are interconnected so as to be capable of exchanging information by using a CAN communication cable 307, etc.

The display monitor 301 has a monitor screen that displays various information. For example, when the communication unit 306 receives a screen display instruction from the communication unit 210 of the vehicle dispatch information data server 2, the road map on which the travel route is drawn and the mode switch factor analysis result message are displayed.

The GPS 302 acquires the current location information (longitude/latitude) of the dispatch vehicle 7. "GPS" is an acronym for "Global Positioning System."

The on-board sensor 303 acquires information for ascertaining the surrounding condition of the dispatch vehicle 7 necessary for autonomous driving. For example, the on-board sensor 303 can be an on-board camera (front camera, left side camera, right side camera, rear camera, etc.) or an obstacle sensor (laser radar, millimeter wave radar, ultrasonic radar, laser range finder, etc.).

The vehicle information unit 304 is a storage unit that temporarily stores vehicle information, such as position information (latitude and longitude), time information, vehicle speed information, autonomous driving ON/OFF information, and override information (accelerator pedal/brake/steering intervention).

The vehicle control unit 305 executes vehicle control for autonomous driving (drive control/braking control/steering control). For example, when a signal from the remote control unit 209 of the vehicle dispatch information data server 2, etc. is received, a control command is output to an actuator 19 such that the dispatch vehicle 7 behaves in accordance with the remote control intervention signal. In addition, when information regarding the calculated travel route is received, a control command is output to the actuator 19 such that the dispatch vehicle 7 travels along the received travel route. Here, a drive actuator, a braking actuator, and a steering actuator correspond to the actuator 19.

The communication unit 306 transmits and receives an exchange of information between the vehicle dispatch information data server 2 and the on-board unit 3. For example, the communication unit 306 periodically (for example, every prescribed number of hours) transmits vehicle information stored in the vehicle information unit 304 to the vehicle dispatch information data server 2 in order to ascertain the moving state of the dispatch vehicle 7 on the vehicle dispatch management center 8 side. In addition, when an irregular remote control intervention signal is received from the remote control unit 209 of the vehicle dispatch information data server 2, the remote control intervention signal is passed on to the vehicle control unit 305.

Figure 5:
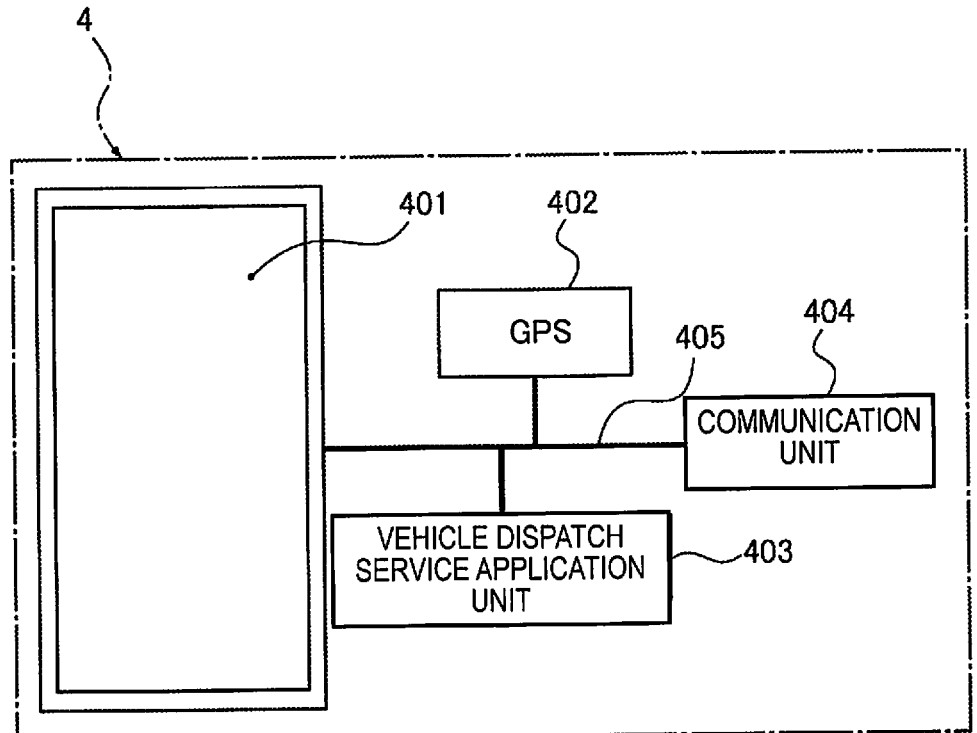
FIG. 5 is a block diagram illustrating the configuration of a mobile terminal (user terminal) in the possession of a user in the vehicle travel route control system.

Detailed Configuration of the Mobile Terminal (FIG. 5)

FIG. 5 shows the configuration of the mobile terminal 4 in the vehicle travel route control system. The detailed configuration of the mobile terminal 4 will be described below with reference to FIG. 5.

The mobile terminal 4 includes the display screen 401, a GPS 402, a vehicle dispatch service application unit 403, and a communication unit 404. The constituent elements of the mobile terminal 4 are interconnected so as to be capable of exchanging information by using a communication cable 405.

The display screen 401 has various information display functions and request input screen display functions. For example, when the user selects a vehicle dispatch service application, a touch panel screen, etc., on which the user can input the destination, and the like, is displayed. In addition, when the communication unit 404 receives a screen display instruction from the communication unit 210 of the vehicle dispatch information data server 2, the road map on which the travel route is drawn and the mode switch factor analysis result message are displayed.

The GPS 402 acquires information regarding the current location (longitude/latitude) of the user operating the mobile terminal 3. With respect to the user's current location information, when there is a dispatch request from the user, the location information of the mobile terminal 3 (=the user's location information) is transmitted to the vehicle dispatch information data server 2 together with the location information of the destination. When the user position and the boarding location coincide, the user's location information is treated as the boarding location information, and when the user position and the boarding location do not coincide, the location information is handled separately.

The vehicle dispatch service application unit 403 is generated when the user downloads vehicle dispatch service application software. The unit starts when the user selects the vehicle dispatch service application from the application screen and has a function for displaying an input screen and a for functioning displaying dispatch-related information received from the vehicle dispatch information data server 2.

The communication unit 404 transmits the user's dispatch request to the vehicle dispatch information data server 2. The road map on which the travel route is drawn and the mode switch factor analysis result message are then received from the vehicle dispatch information data server 2. When the dispatch vehicle 7 is determined, the necessary information can be exchanged between the mobile terminal 4 and the on-board unit 3 as well.

Next, "background art and measures to solve the problem" will be described. Then, the operation of the first embodiment will be described separately with respect to the "operation of the travel route calculation process" and "travel route calculation operation."

Background Art and Problem-Solving Measures

For example, in a vehicle dispatch management center that manages dispatch vehicles having an autonomous driving function for driverless autonomous driving vehicles, a control operator in front of a dashboard on which vehicle dispatch management monitors are arrayed centrally manages the movements of a plurality of dispatch vehicles.

Here, examples of management work carried out by the control operator include (1) The monitoring work to observe the movements of dispatch vehicles displayed on the dispatch management monitors.
(2) When the vehicle dispatch management center is notified by using a transmission from a dispatch vehicle of a situation that requires an override, the work to instruct the behavior of the dispatch vehicle by using remote control intervention after a changeover to manual driving mode.
(3) The work to switch manual driving mode to autonomous driving mode when the dispatch vehicle that received the remote control intervention returns to the travel route in autonomous driving mode.

Thus, although the system monitoring load also depends on the number of dispatch vehicles that are to be managed by the vehicle dispatch service, there is the problem of the system monitoring load becoming high at the vehicle dispatch management center, such that it becomes necessary to allocate a large number of control operators.

With respect to this problem, Patent Document 1 (Japanese Laid-Open Patent Application No. 2017-151041) for example, proposes a technology in which the traffic volume of vehicles capable of executing autonomous driving is used as a parameter in the preferential selection of roads that have heavier traffic volume to determine the recommended route.

However, a road that has a heavier traffic volume of vehicles that are capable of executing autonomous driving does not necessarily mean that the road has a light traffic volume of autonomous driving vehicles that have been switched over to manual driving mode: thus, arterial roads with heavy traffic volume of vehicles are primarily selected as the recommended route.

For example, even if there are many autonomous driving vehicles that have undergone a changeover from autonomous driving mode to manual driving mode per unit time, a road would be selected as the recommended route simply because the road has a heavy traffic volume of vehicles that are able to execute autonomous driving. Conversely, even if there are no autonomous driving vehicles that have undergone a changeover from autonomous driving mode to manual driving mode per unit time, a road would not be selected as the recommended route simply because the road has a light traffic volume of vehicles that are able to execute autonomous driving.

Thus, during travel on the selected recommended route by use of an autonomous driving mode, there is a high probability that the mode has been switched over to manual driving mode. As a result, when a plurality of dispatch vehicles are centrally managed, a control operator would not be able to know which dispatch vehicle should be watched and when; thus, there is the problem that system monitoring load cannot be reduced.

In addition, autonomous driving services presently require control operators who can carry out remote control interventions in the event of an emergency. However, if only the traffic volume described above is used as a parameter, the routes on which service can be provided will become uniform, so that system monitoring would become necessary at the same points. As a result, there is also the problem that the system monitoring load of the control operator would never decrease.

With respect to the problem described above, this disclosure was achieved by focusing, not on the traffic volume of vehicles that are able to execute autonomous driving, but on the driving mode switching positions at which vehicles switched over during travel to a manual driving mode from autonomous driving mode. The means used to solve the problem is a vehicle travel route control system that controls a plurality of dispatch vehicles $7n$ having an autonomous driving function, comprising the mobile terminal 4 that sends a dispatch request to a destination, the vehicle dispatch information data server 2 that, upon receiving the dispatch request, extracts a dispatch vehicle candidate from among the plurality of dispatch vehicles $7n$ and calculates a travel route for the dispatch vehicle candidate, and the on-board unit 3 that receives travel route information of the dispatch vehicle candidate calculated by the vehicle dispatch information data server 2. The vehicle dispatch information data server 2 creates the travel route map M, in which information regarding driving mode switching positions (● marks, ○ marks) at which a large number of autonomous driving vehicles switched over to a manual driving mode during travel in an autonomous driving mode have been added to a road map. A travel route is then calculated which avoids the driving mode switching positions (● marks, ○ marks), from among a plurality of routes on which the dispatch vehicle candidate travels to the destination via the boarding location, based on the travel route map M and the current location of the dispatch vehicle candidate. When the calculation of a travel route that avoids the driving mode switching positions (● marks, ○ marks) is successful, the dispatch vehicle candidate for which the route calculation succeeded is set as the dispatch vehicle 7, and the calculated travel route is transmitted to the on-board terminal 3 mounted in the dispatch vehicle 7 as the travel route information.

That is, the travel route map M is created by adding to a road map the driving mode switching positions (● marks, ○ marks), at which autonomous driving vehicles switched over during travel to manual driving mode autonomous driving mode. Then, when the travel route of the dispatch vehicle candidate is calculated, the travel route map M is referenced, and, from among a plurality of routes that pass from the current location to the destination, a route that avoids the driving mode switching positions (● marks, ○ marks) is calculated as the travel route of the dispatch vehicle candidate.

Thus, when the plurality of dispatch vehicles $7n$ are centrally managed, travel route completion reliability is improved by calculating a route that reliably supports continued autonomous driving mode, so that it is thereby possible to reduce the system monitoring load. That is, dispatch vehicles that should be watched during system monitoring are dispatch vehicles that travel through points at which the frequency of occurrence of overrides is high. However, since travel route completion reliability is improved by calculating a travel route that avoids the driving mode switching positions (=override positions), the number of dispatch vehicles to be watched is reduced; thus, monitoring efficiency improves, and it becomes possible to reduce the system monitoring load. The effect of reducing the system monitoring load also leads to a reduction in the number of control operators, while high system monitoring accuracy is maintained.

Figure 6:
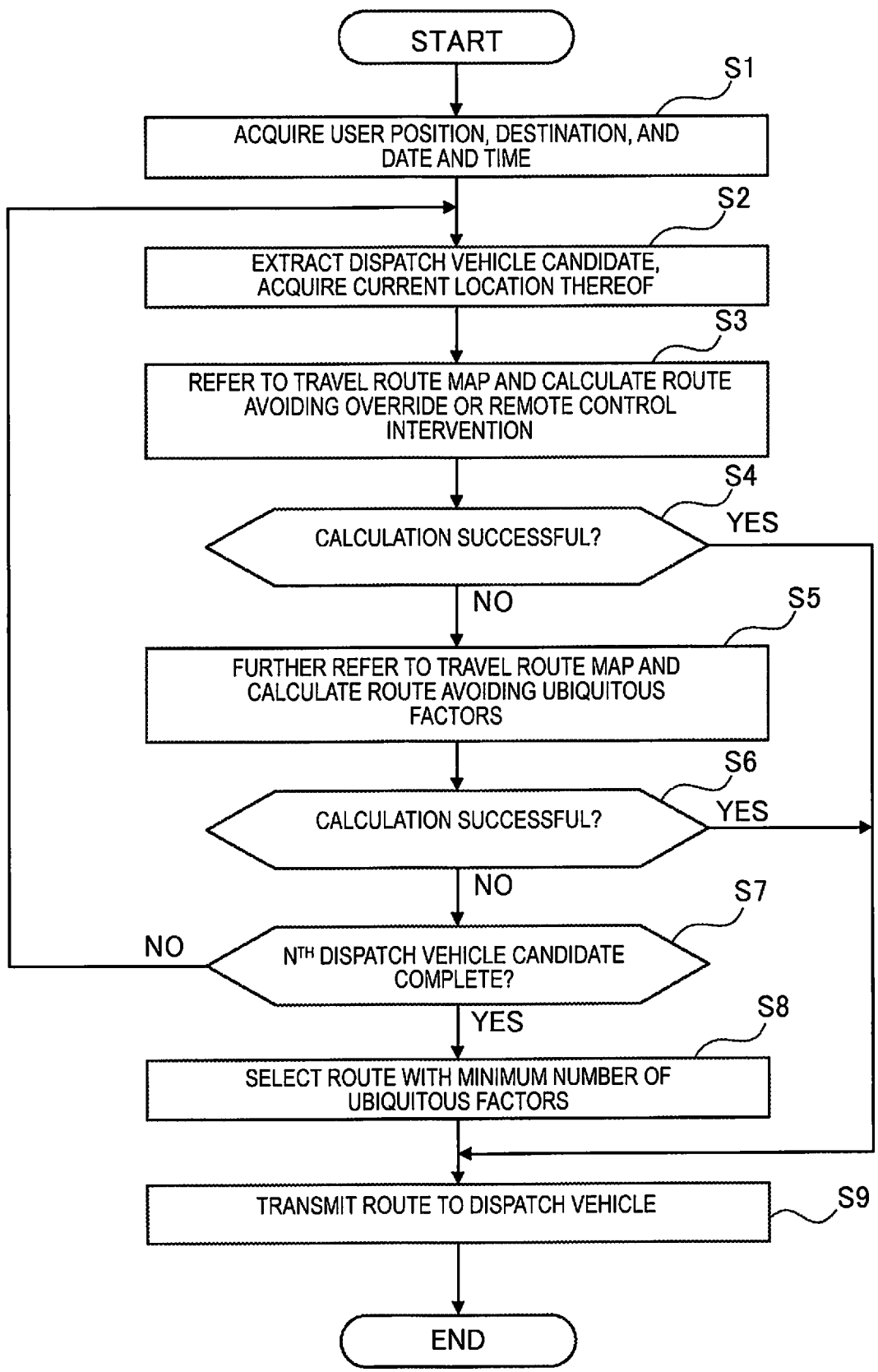
FIG. 6 is a flowchart illustrating the travel route calculation process that is executed in the travel route calculation unit of the vehicle dispatch information data server.

Operation of the Travel Route Calculation Process (FIG. 6)

FIG. 6 shows the travel route calculation process flow that is executed in the travel route calculation unit 208 of the vehicle dispatch information data server 2. The operation of the travel route calculation process will be described below with reference to FIG. 6. The dispatch vehicle candidates that have been prioritized based on the user position information and the location information of the destination are referred to as a first dispatch vehicle candidate 7-1, a second dispatch vehicle candidate 7-2, . . . , and an nth dispatch vehicle candidate 7-n.

When a dispatch request is received from the mobile terminal 4, the location information of the mobile terminal 4 (user position information), the location information of the destination, and the date and time information are acquired (S1). Next, the first dispatch vehicle candidate 7-1 is extracted as the first dispatch vehicle candidate, and the location information of the dispatch vehicle candidate at the extracted timing is acquired (S2). Next, the travel route map M that has intervention factor information is selected based on the date and time that the dispatch request was received. Then, with reference to the travel route map M, of a plurality of routes that pass from the current location to the destination via the boarding location, a route that avoids the driving mode switching positions (● marks, ○ marks) or a route that avoids remote control interventions is calculated as the travel route of the dispatch vehicle candidate (S3). When the calculation of a route that avoids the driving mode switching positions (● marks, ○ marks) is successful (YES is S4), the dispatch vehicle candidate for which the route calculation succeeded is set as the dispatch vehicle 7, travel route information for traveling along the calculated travel route is transmitted to the on-board terminal 3 of the dispatch vehicle 7 (S9), and the process proceeds to END.

On the other hand, if the calculation of a travel route that avoids the driving mode switching positions (● marks, ○ marks) is not successful (NO in S4), the travel route map M that has intervention factor information is referenced, and a route that avoids only driving mode switching positions due to "ubiquitous events" (● marks) is calculated as the travel route of the dispatch vehicle 7 (S5). That is, of the plurality of routes that pass from the current location to the destination via the user position, a route that avoids the driving mode switching positions due to ubiquitous events (● marks) but that allows the presence of the driving mode switching positions due to temporary unexpected events (○ marks) is calculated as the travel route. When the calculation of a route that avoids the driving mode switching positions due to ubiquitous events (● marks) is successful (YES in S6), the dispatch vehicle candidate for which the route calculation succeeded is set as the dispatch vehicle 7, travel route information for travel along the calculated travel route is transmitted to the on-board terminal 3 of the dispatch vehicle 7 (S9), and the process proceeds to END.

On the other hand, when the calculation of a route that avoids the driving mode switching positions due to ubiquitous events (● marks) is not successful (NO in S6), it is determined whether the route calculation for the last nth dispatch vehicle candidate 7-n has been completed (S7). If only the route calculation of the first dispatch vehicle candidate 7-1 is complete (NO in S7), the dispatch vehicle candidate is switched to the second dispatch vehicle candidate 7-2, the process returns to S2 and proceeds from S3→S4→S5→S6 to re-execute the travel route calculation process.

Then, if the route calculation process for the nth dispatch vehicle candidate 7-n is completed without calculation of the travel route, even if re-calculation is repeated (YES in S7), a route for which there is a minimum number of driving mode switching positions due to "ubiquitous events" (● marks) in the travel route calculation process is selected (S8). Then, the dispatch vehicle candidate for which the number of driving mode switching positions due to "ubiquitous events" (● marks) is minimal is set as the dispatch vehicle 7, travel route information for travel along the selected travel route is transmitted to the on-board terminal 3 of the dispatch vehicle 7 (S9), and the process proceeds to END.

The route selected in S8 is a final backup route, so that it is not limited to the route with the minimum number of driving mode switching positions due to "ubiquitous events" (● marks). For example, it may be a travel route generated in accordance with a target route generation method in autonomous driving mode in the vehicle dispatch information data server 2 or the on-board unit 3 of the dispatch vehicle 7, unrelated to the driving mode switching positions.

In this manner, if the calculation of a travel route that avoids the driving mode switching positions (● marks, ○ marks) is not successful, the travel route map M that has intervention factor information is referenced, and a route that allows for the presence of driving mode switching positions due to unexpected events (○ marks) but avoids driving mode switching positions due to ubiquitous events (● marks) is calculated as the travel route of the dispatch vehicle 7 (S5). That is, if a route that avoids driving mode switching positions (● marks, ○ marks) cannot be calculated, a travel route of the dispatch vehicle 7 that includes driving mode switching positions due to temporary unexpected events (○ marks), at which an override is not likely to be repeated, is calculated. For this reason, it becomes a backup for cases in which a route that avoids driving mode switching positions (● marks, ○ marks) cannot be calculated, and it becomes possible to calculate a travel route that suppresses switching to manual driving mode.

When there is a plurality of dispatch vehicle candidates that can be selected based on the location information of the destination, the plurality of dispatch vehicle candidates 7-1, 7-2, . . . , 7-n are switched in order of priority to calculate the route. That is, if the calculation of the travel route for the first dispatch vehicle candidate 7-1 is not successful, the travel route is recalculated for the second dispatch vehicle candidate 7-2, and the recalculation of the travel route is repeated for the number of dispatch vehicle candidates. For this reason, if the travel route cannot be calculated for the first dispatch vehicle candidate 7-1, the travel route calculations for the second dispatch vehicle candidate 7-2 and those that follow become the backup, and it becomes possible to increase the probability of a successful route calculation route based on the driving mode switching positions.

The current location of the dispatch vehicle 7 and the location information of the destination are acquired along with date and time information, including weekday/holiday and time of day, and when the travel route is calculated, the travel route map M corresponding to the date and time information is referenced. That is, the traffic flow and the traffic volume are different depending on whether it is a weekday or a holiday, and whether the time of day is morning, noon, or afternoon. When the travel route map M is created, maps with different driving mode switching positions are created, and, in particular, driving mode switching positions due to ubiquitous events such as the late-afternoon sun are eliminated in the morning and noon time slots. For this reason, when the travel route of the dispatch vehicle 7 is calculated, appropriate route calculations are carried out in consideration of the date and time information, including weekday/holiday and time of day, so that the probability of a successful route calculation route can be increased compared to the case in which one travel route map is referenced, without consideration of the date and time information.

Figure 7:
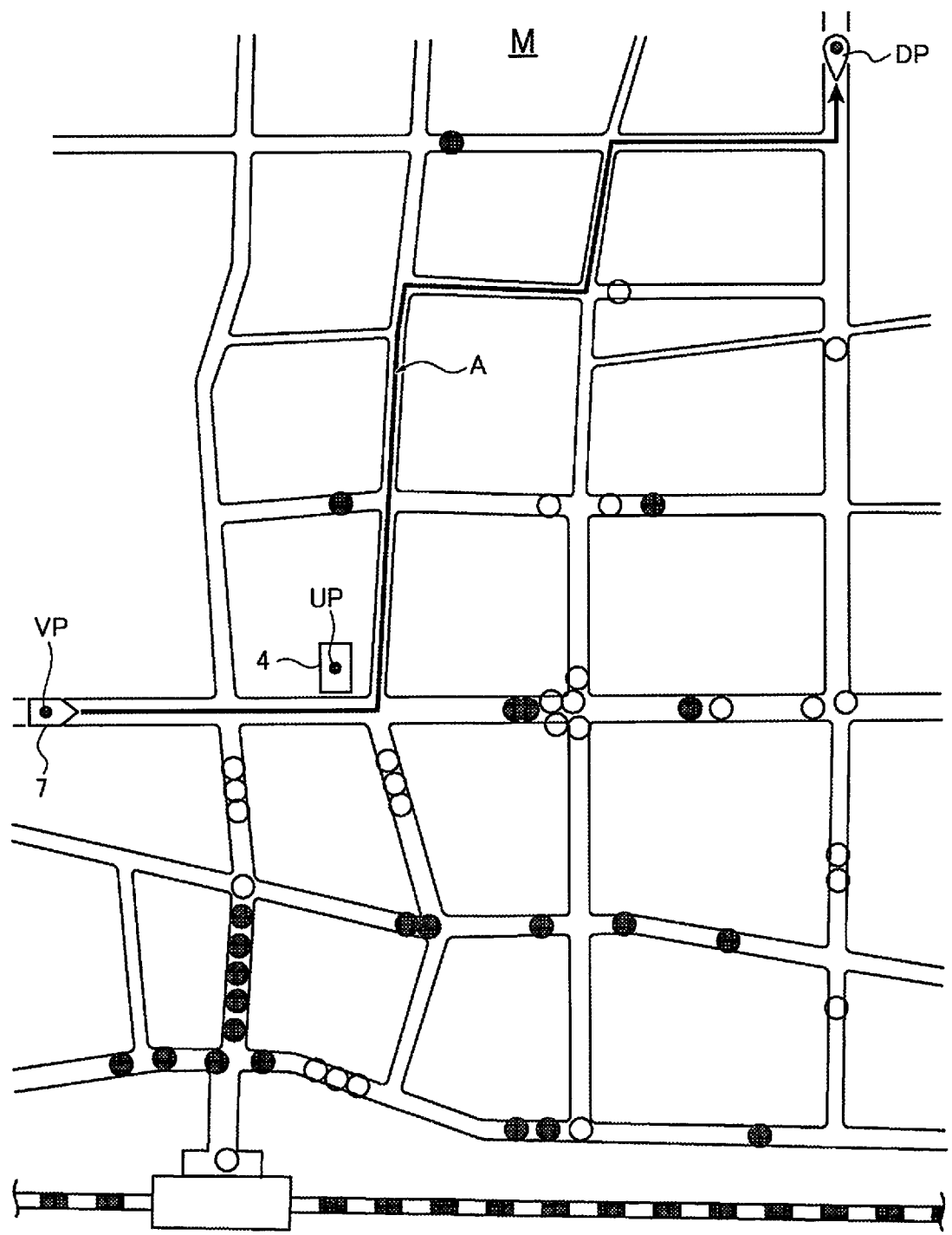
FIG. 7 is a travel route calculation operation explanatory diagram illustrating one example of a travel route calculation operation for avoiding driving mode switching positions.
Figure 8:
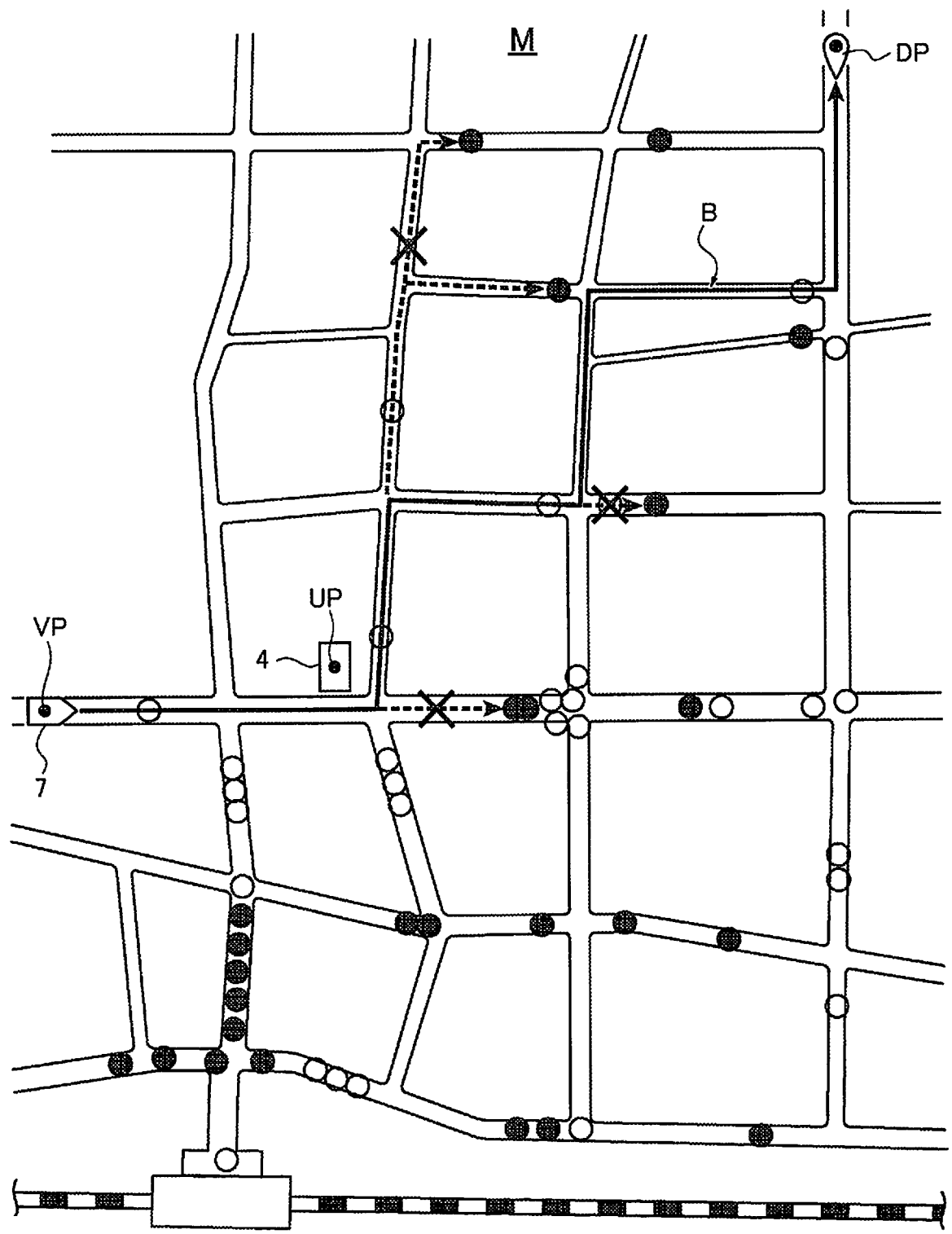
FIG. 8 is a travel route calculation operation explanatory diagram illustrating one example of a travel route calculation operation for avoiding the driving mode switching positions due to ubiquitous events.
Figure 9:
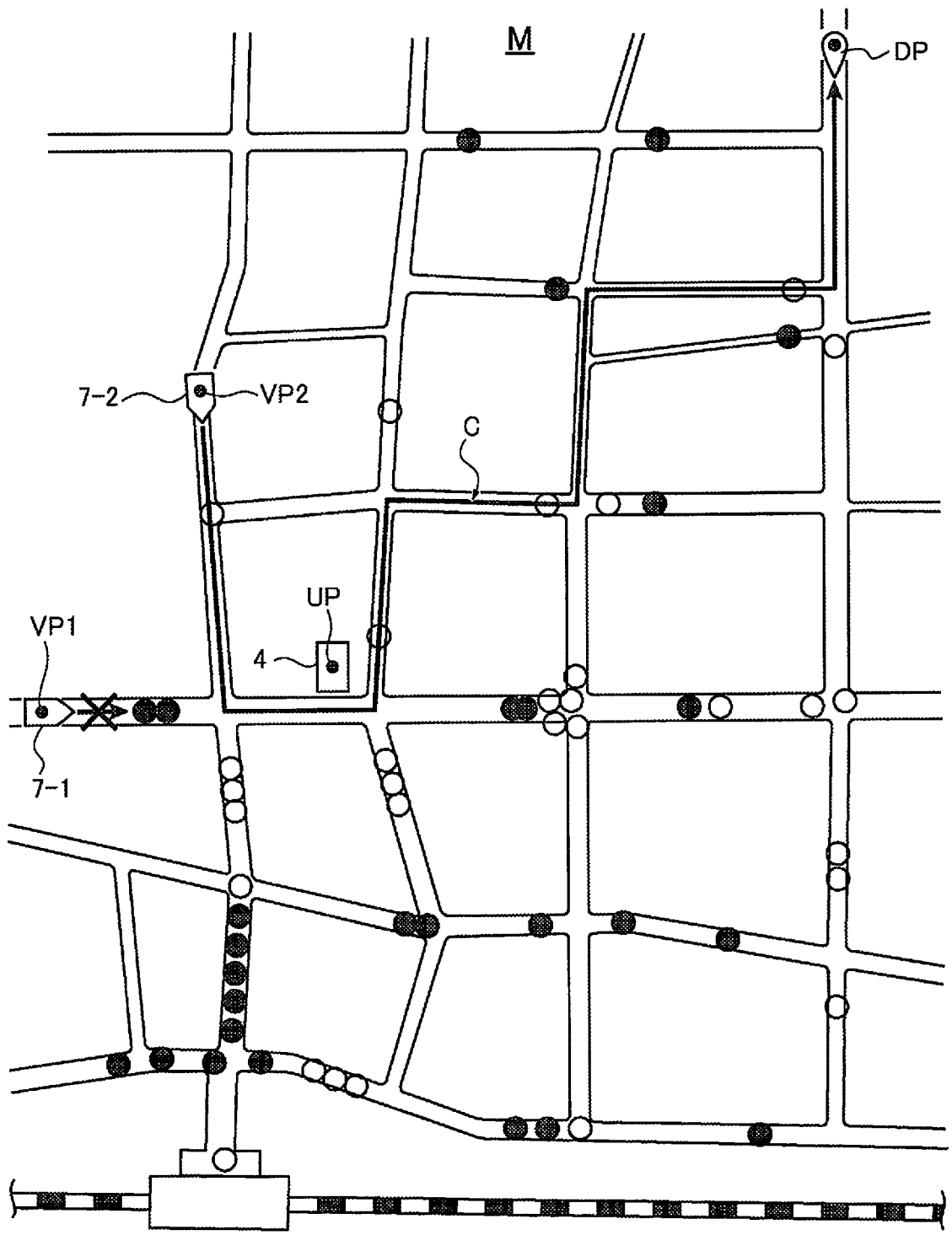
FIG. 9 is a travel route calculation operation explanatory diagram illustrating one example of a travel route calculation operation when there are a plurality of dispatch vehicle candidates.

Travel Route Calculation Operation (FIGS. 7-9)

The travel route calculation operation will be described below with reference to FIGS. 7-9. In the following description, the destination is DP, the user position indicated by the mobile terminal 4 (=boarding location) is UP, the current location of the dispatch vehicle 7 is VP, the current location of the first dispatch vehicle candidate is VP1, and the current location of the second dispatch vehicle candidate is VP2.

Travel Route Calculation Operation for Avoiding the Driving Mode Switching Positions FIG. 7 shows one example of the travel route calculation operation for avoiding the driving mode switching positions. The travel route calculation operation for avoiding the driving mode switching positions will be described below with reference to FIG. 7.

In the travel route map M on which the driving mode switching positions are represented by ○ marks and ● marks, it shall be assumed that the destination DP, the user position UP, and the current location VP of the dispatch vehicle 7 have the relationship shown in FIG. 7. Here, of the plurality of routes that start from the current location VP of the dispatch vehicle 7 and arrive at the destination DP via the user position UP indicated by the mobile terminal 4, there is a route A that can be drawn that does not pass through any of the driving mode switching positions (● marks, ○ marks). Thus, given the relationship shown in FIG. 7, the route A, which avoids the driving mode switching positions (● marks, ○ marks), is calculated as the travel route of the dispatch vehicle 7.

Travel Route Calculation Operation for Avoiding the Driving Mode Switching Positions Due to Ubiquitous Events FIG. 8 shows one example of the travel route calculation operation for avoiding the driving mode switching positions due to ubiquitous events. The travel route calculation operation for avoiding the driving mode switching positions due to ubiquitous events will be described below with reference to FIG. 8.

In the travel route map M on which the driving mode switching positions are represented by ○ marks and ● marks, it shall be assumed that the destination DP, the user position UP, and the current location VP of the dispatch vehicle 7 have the relationship shown in FIG. 8. Here, of the plurality of routes that start from the current location VP of the dispatch vehicle 7 and arrive at the destination DP via the user position UP indicated by the mobile terminal 4, there is no route that can be drawn that does not pass through any of the driving mode switching positions (● marks, ○ marks). However, there is a route B that avoids the driving mode switching positions due to ubiquitous events (● marks). Thus, given the relationship shown in FIG. 8, the route B, which avoids the driving mode switching positions due to ubiquitous events (● marks), is calculated as the travel route of the dispatch vehicle 7. The routes represented by the broken lines in FIG. 8 are routes that could not be drawn because of the presence of driving mode switching positions due to ubiquitous events (● marks).

(Travel Route Calculation Operation When There is a Plurality of Dispatch Vehicle Candidates FIG. 9 shows one example of a travel route calculation operation when there is a plurality of dispatch vehicle candidates 7-1, 7-2, . . . , 7-n. The travel route calculation operation when there is a plurality of dispatch vehicle candidates 7-1, 7-2, . . . , 7-n will be described below with reference to FIG. 9.

In the travel route map M in which the driving mode switching positions are represented by ○ marks and ● marks, it shall be assumed that the destination DP, the user position UP, the current location VP1 of the first dispatch vehicle candidate 7-1, and the current location VP2 of the second dispatch vehicle candidate 7-2 have the relationship shown in FIG. 9. Here, even if one attempts to draw a route from the current location VP1 of the first dispatch vehicle candidate 7-1 to the user position UP indicated by the mobile terminal 4, it is not possible because of the driving mode switching positions due to ubiquitous events (● marks).

Thus, the dispatch vehicle candidate is switched from the first dispatch vehicle candidate 7-1 to the second dispatch vehicle candidate 7-2. In this case, of a plurality of routes that start from the current location VP2 of the second dispatch vehicle candidate 7-2 and arrive at the destination DP via the user position UP indicated by the mobile terminal 4, there is no route that can be drawn that does not pass through any of the driving mode switching positions (● marks, ○ marks). However, a route C can be drawn that avoids the driving mode switching positions due to ubiquitous events (● marks). Thus, given the relationship shown in FIG. 9, the dispatch vehicle candidate is switched from the first dispatch vehicle candidate 7-1 to the second dispatch vehicle candidate 7-2, and the route C that avoids the driving mode switching positions due to ubiquitous events (● marks) is calculated as the travel route of the dispatch vehicle 7.

As described above, the following effects are exhibited by the vehicle travel route control system, the vehicle travel route control device, and the vehicle travel route control method according to claim 1.

(1) A vehicle travel route control system that controls a plurality of vehicles having an autonomous driving function or a driving assist function, comprising a user terminal (mobile terminal 4) that sends a dispatch request to a destination DP, a vehicle dispatch controller (vehicle dispatch information data server 2) that, when the dispatch request is received, extracts a dispatch vehicle candidate from among the plurality of vehicles and calculates a travel route for the dispatch vehicle candidate, and an on-board terminal (on-board unit 3) that receives travel route information of the dispatch vehicle candidate calculated by the vehicle dispatch controller, wherein the vehicle dispatch controller (vehicle dispatch information data server 2) creates a travel route map M, in which information related to driving mode switching positions (● marks, ○ marks) at which vehicles switched over to a manual driving mode during travel in an autonomous driving mode, which is the driving mode by use of the autonomous driving function or the driving assist function of the vehicle, have been added to a road map, calculates a travel route that avoids the driving mode switching positions (● marks, ○ marks) from among a plurality of routes on which the dispatch vehicle candidate travels to the destination DP via a boarding location (user position UP), based on the travel route map M and position information (current location VP) of the dispatch vehicle candidate at the extracted timing, and when a travel route that avoids the driving mode switching positions (● marks, ○ marks) is calculated, sets the dispatch vehicle candidate for which the travel route could be calculated as the dispatch vehicle 7, and transmits the calculated travel route information to the on-board terminal (on-board unit 3) mounted in the dispatch vehicle 7. Thus, where a plurality of dispatch vehicles 7*n* are centrally managed, it is possible to propose a vehicle travel route control system that can reduce the load on system monitoring by using route calculation (calculation of the route A) that improves travel route completion reliability.

(2) The vehicle dispatch controller (vehicle dispatch information data server 2) analyzes intervention factors that caused a switch to a manual driving mode during travel in the autonomous driving mode, intervention factor information regarding whether the driving mode switching position is a driving mode switching position due to ubiquitous events (● mark) or a driving mode switching position due to temporary unexpected events (○ mark), determined based on an analysis result of intervention factors, is added to the travel route map M, and if a travel route that avoids the driving mode switching positions (● marks, ○ marks) cannot be calculated, the travel route map M that has the intervention factor information is referenced, and a route that allows for the presence of driving mode switching positions due to unexpected events (○ marks) but avoids driving mode switching positions due to ubiquitous events (● marks) is calculated as the travel route of the dispatch vehicle candidate. For this reason, as a backup for cases in which a travel route that avoids driving mode switching positions (● marks, ○ marks) cannot be calculated, by avoiding the driving mode switching positions due to ubiquitous events (● marks), it becomes possible to calculate a travel route (route B) that suppresses switching to the manual driving mode.

(3) When there is a plurality of dispatch vehicle candidates that can be selected based on location information of the destination DP, the vehicle dispatch controller (vehicle dispatch information data server 2) changes the order of priority of a plurality of dispatch vehicle candidates 7-1, 7-2, . . . , 7-*n* to calculate the travel route. For this reason, if the travel route cannot be calculated for the first dispatch vehicle candidate 7-1, the travel route calculations (calculation of the route C) for the second dispatch vehicle candidate 7-2 and those that follow become the backup, and it becomes possible to increase the probability of a successful route calculation route based on the driving mode switching positions (● marks, ○ marks).

(4) The vehicle dispatch controller (vehicle dispatch information data server 2) acquires information regarding the driving mode switching positions (● marks, ○ marks) at which vehicles switched to the manual driving mode during travel in the autonomous driving mode, along with date and time information, including weekday/holiday and time of day, when the driving mode switching positions (● marks, ○ marks) and date and time information are acquired; the travel route map M, where the driving mode switching positions (● marks, ○ marks) have been added to a road map, is created separated by weekday/holiday and time of day; when the travel route is calculated, the location information of the dispatch vehicle candidate and the location information of the destination DP are acquired along with date and time information, including weekday/holiday and time of day; and the travel route map M created in correspondence with the date and time information is referenced. For this reason, when the travel route of the dispatch vehicle 7 is calculated, the calculation of an appropriate route is executed in consideration of the date and time information, including weekday/holiday and time of day; thus, the probability of a successful travel route calculation can be increased compared to the case in which one travel route map is referenced.

(5) When a travel route that avoids the driving mode switching positions (● marks, ○ marks) is calculated, the vehicle dispatch controller (vehicle dispatch information data server 2) draws the travel route on the road map, and transmits travel route information, including a signal for displaying the road map on which the travel route is drawn, to the on-board terminal (on-board unit 3) and/or the user terminal (mobile terminal 4). For this reason, a driver of the dispatch vehicle 7 or a user operating the user terminal (mobile terminal 4) can visually recognize the travel route when the dispatch vehicle 7 would travel toward the destination DP. In the case of a driverless dispatch vehicle 7, the road map on which the travel route is drawn may be displayed only on the user terminal (mobile terminal 4).

(6) When a travel route, which avoids driving mode switching positions due to ubiquitous events (● marks) but allows the presence of driving mode switching positions due to unexpected events (○ marks), is calculated based on the travel route map M having the intervention factor information, the vehicle dispatch controller (vehicle dispatch information data server 2) transmits travel route information, which includes a signal for displaying the intervention factor analysis result as a message, to the on-board terminal (on-board unit 3) and/or the user terminal (mobile terminal 4). For this reason, the driver of the dispatch vehicle 7 and the user operating the mobile terminal 4 (user terminal) are able to know the reason that a route that avoids the driving mode switching positions due to ubiquitous events (● marks) was calculated. In the case of the driverless dispatch vehicle 7, the message may be displayed only on the mobile terminal 4 (user terminal).

(7) A vehicle travel route control device that controls a plurality of vehicles having an autonomous driving function or a driving assist function, comprising the vehicle information database 202 that stores information regarding driving mode switching positions (● marks, ○ marks) at which vehicles switched over to a manual driving mode during travel in an autonomous driving mode, which is the driving mode by use of an autonomous driving function or a driving assist function of a vehicle, the travel route map creation unit 206, which creates a travel route map M, where the driving mode switching positions (● marks, ○ marks) have been added to a road map, based on the vehicle information database 202; the position information acquisition unit 207 that, when a dispatch request is received, acquires boarding location (user position UP) and position information of the destination DP, extracts a dispatch vehicle candidate from among a plurality of vehicles, and acquires location information (current location VP) of the dispatch vehicle candidate at the extracted timing; the travel route calculation unit 208 that calculates a route that avoids the driving mode switching positions (● marks, ○ marks) from a plurality of routes on which the dispatch vehicle candidate travels to the destination DP via the boarding location (user position UP), based on the travel route map M and the position information (current location VP) of the dispatch vehicle candidate; and the communication unit 210 that, when a travel route that avoids the driving mode switching positions (● marks, ○ marks) is calculated, sets the dispatch vehicle candidate for which the travel route could be calculated as the dispatch vehicle 7, and transmits the calculated travel route information to the dispatch vehicle 7. Thus, it is possible propose a vehicle travel route control device that can reduce the system monitoring load by using route calculation (calculation of the route A) that improves travel route completion reliability, when the plurality of dispatch vehicles 7*n* are centrally managed.

(8) The intervention factor analysis unit 203 that analyzes intervention factors that caused a switch to the manual driving mode during travel in the autonomous driving mode, and the intervention factor database 204 that stores intervention factor information regarding whether the factors that caused driving mode switching positions (● marks, ○ marks) are ubiquitous events or temporary unexpected events, based on the analysis result of the intervention factor analysis unit 203 are further provided, wherein the travel route map creation unit 206 adds the driving mode switching positions (● marks, ○ marks) having the intervention factor information to the road map to create the travel route map M, and if a travel route that avoids the driving mode switching positions (● marks, ○ marks) cannot be calculated, the travel route calculation unit 206 calculates a travel route that allows for the presence of driving mode switching positions due to unexpected events (○ marks) but avoids driving mode switching positions due to ubiquitous events (● marks), based on the travel route map M having the intervention factor information. For this reason, as a backup for cases in which the calculation of a travel route that avoids driving mode switching positions (● marks, ○ marks) is not successful, it becomes possible to calculate a travel route that suppresses switching to the manual driving mode by avoiding only the driving mode switching positions due to ubiquitous events (● marks).

(9) A vehicle travel route control method realized by using intercommunication among a vehicle dispatch controller (vehicle dispatch information data server 2) for controlling a plurality of vehicles having an autonomous driving function or a driving assist function, on-board terminals (on-board unit 3) mounted in a plurality of vehicles, and user terminals (mobile terminal 4), comprising: a vehicle dispatch controller (vehicle dispatch information data server 2) creating a travel route map M, in which driving mode switching positions (● marks, ○ marks) at which vehicles switched over to a manual driving mode during travel in an autonomous driving mode, which is the driving mode by use of an autonomous driving function or a driving assist function of the vehicle, have been added to a road map, acquiring boarding location (user position UP) and position information of the destination DP, extracting a dispatch vehicle candidate from among a plurality of vehicles, and acquiring location information (current location VP) of the dispatch vehicle candidate at the extracted timing, when a dispatch request is received from the user terminal (mobile terminal 4), calculating a route that avoids the driving mode switching positions (● marks, ○ marks) from among a plurality of routes on which the dispatch vehicle candidate travels to the destination DP via a boarding location (user position UP), based on the travel route map M, when acquiring the location information of the dispatch vehicle candidate (current location VP), and setting the dispatch vehicle candidate for which the travel route could be calculated as the dispatch vehicle 7, and transmitting the calculated travel route information to the on-board terminal (on-board unit 3) mounted in the dispatch vehicle 7, when a travel route that avoids the driving mode switching positions (● marks, ○ marks) is calculated. Thus, it is possible propose a vehicle travel route control method that can reduce the system monitoring load by using route calculation (calculation of the route A) that improves travel route completion reliability, when the plurality of dispatch vehicles 7n are centrally managed.

Second Embodiment

The second embodiment is an example in which, from the standpoint of improving the work efficiency of the control operator, the remote control function based on the control operator's determination is expanded compared to the first embodiment, and the control operator is given the authority to create or correct the travel route based on a presented route.

An "overall system configuration," "detailed configuration of a vehicle dispatch information data server," and a "detailed configuration of a control operator operating device" will be described separately below in relation to the configuration of the second embodiment.

Figure 10:
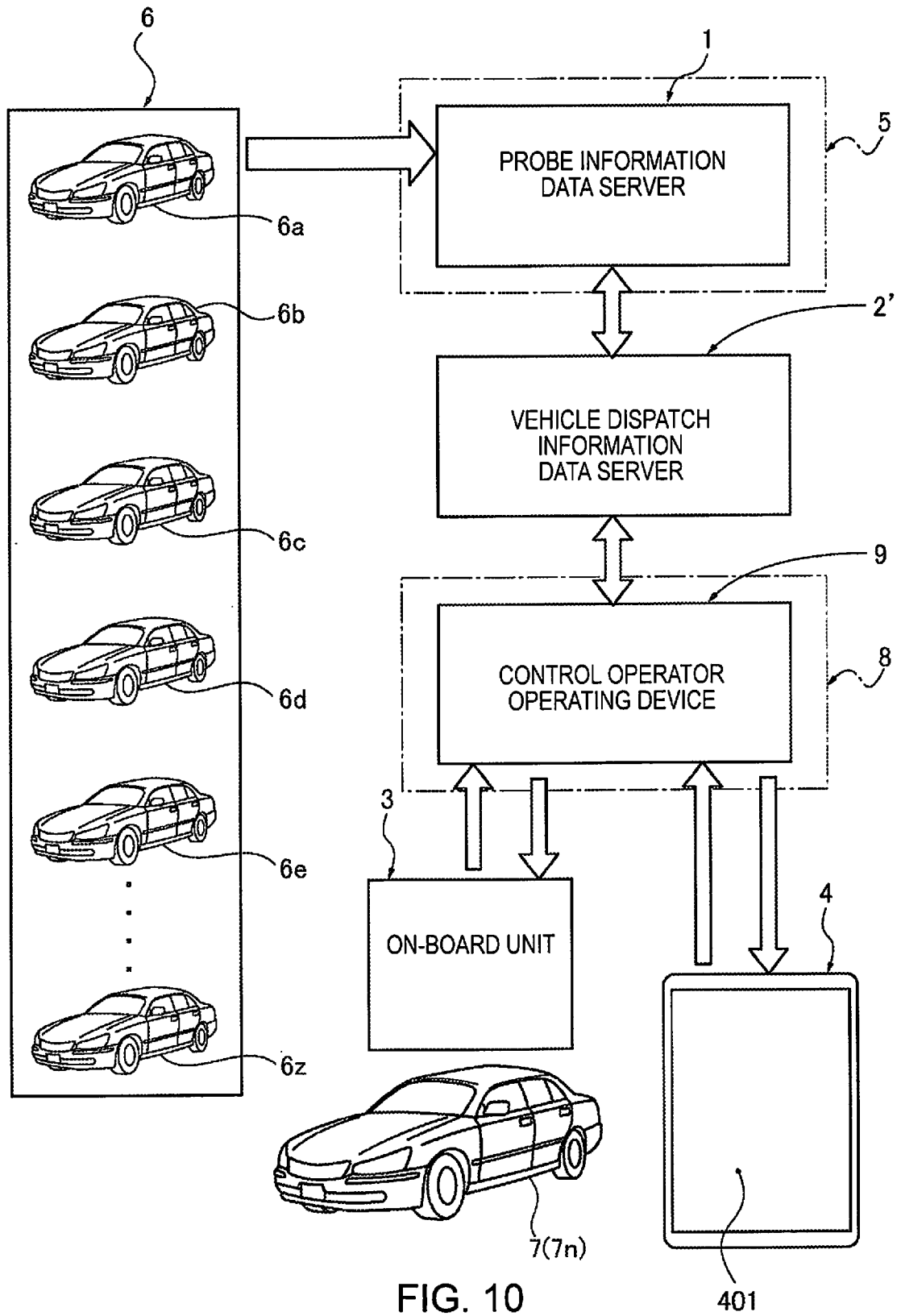
FIG. 10 is a network configuration diagram illustrating the overall configuration of a vehicle dispatch information network to which is applied a vehicle travel route control system, a vehicle travel route control device, and vehicle travel route control method according to a second embodiment.

Overall System Configuration (FIG. 10)

FIG. 10 shows an overall configuration of a vehicle dispatch information network to which is applied a vehicle travel route control system, a vehicle travel route control device, and vehicle travel route control method according to a second embodiment. The overall system configuration of the vehicle dispatch information network will be described below with reference to FIG. 10.

As shown in FIG. 10, the vehicle dispatch information network includes a probe information data server 1, a vehicle dispatch information data server 2' (vehicle dispatch controller), an on-board unit 3 (on-board terminal), a mobile terminal 4 (user terminal), and a control operator operating device 9. These information devices exchange information by using mutual wireless communication.

The vehicle dispatch information data server 2' is installed in a vehicle dispatch information network in which a plurality of the dispatch vehicles 7n are the target of vehicle dispatch service management. That is, the vehicle dispatch information data server 2 according to the first embodiment both calculates the travel route and sends travel route information to the dispatch vehicle 7. In contrast, the vehicle dispatch information data server 2' according to the second embodiment has only the travel route calculation function, while the function to create or correct and transmitting the final travel route information to the dispatch vehicle 7 is separated, and the separated function is provided in the control operator operating device 9. Thus, the installation location of the vehicle dispatch information data server 2' is not limited to the vehicle dispatch management center 8, but may also include various places and regions, whether domestic or foreign.

The control operator operating device 9 is installed in the vehicle dispatch management center 8 that manages the travel routes of a plurality of the dispatch vehicles 7n, and travel route information is created by using a remote control input based on the determination of a control operator MO. That is, when the vehicle dispatch information data server 2' successfully calculates the travel route, the travel route that avoids the driving mode switching positions is presented on a monitor screen based on the successful calculation of the travel route. Then, for example, it is assumed that the control operator MO determines that there are no problems in terms of traveling on the route presented on the monitor screen, and inputs a permission operation. In this case, the dispatch vehicle candidate in accordance with the presented route is set as the dispatch vehicle 7, and the presented route is transmitted as the travel route information to the on-board unit 3 mounted in the dispatch vehicle 7.

The probe information data server 1, the on-board unit 3, and the mobile terminal 4 have the same configurations as those in the first embodiment, so that the descriptions thereof are omitted.

Figure 11:
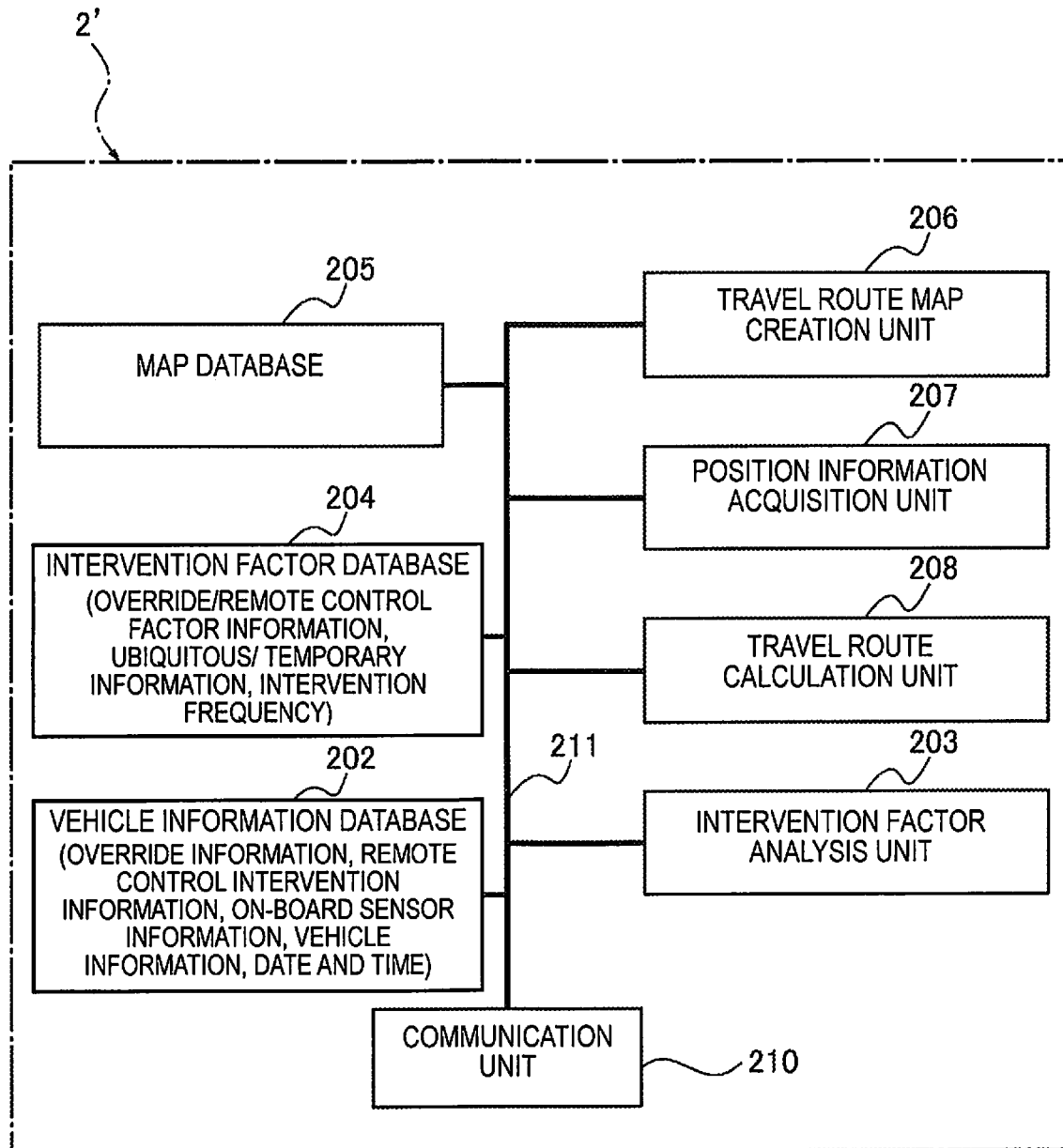
FIG. 11 is a block diagram illustrating the configuration of a vehicle dispatch information data server provided in a vehicle dispatch information network in the vehicle travel route control system.

Detailed Configuration of the Vehicle Dispatch Information Data Server (FIG. 11)

FIG. 11 shows a configuration of the vehicle dispatch information data server 2' provided in the vehicle dispatch information network in the vehicle travel route control system. The detailed configuration of the vehicle dispatch information data server 2' will be described below with reference to FIG. 11.

The vehicle dispatch information data server 2' includes the vehicle information database 202, the intervention factor analysis unit 203, the intervention factor database 204, the map database 205, the travel route map creation unit 206, the position information acquisition unit 207, the travel route calculation unit 208, and the communication unit 210. The constituent elements of the vehicle dispatch information data server 2 are interconnected so as to be capable of exchanging information by using a CAN communication cable 211, etc. That is, the vehicle dispatch information data server has a configuration in which the dispatch management monitor 201 and the remote control unit 209 are removed from the vehicle dispatch information data server 2 of the first embodiment. The vehicle information database 202, the intervention factor analysis unit 203, the intervention factor database 204, the map database 205, and the position information acquisition unit 207 are the same as those in the vehicle information database 2 of the first embodiment, so that descriptions thereof are omitted.

The travel route map creation unit 206 adds the driving mode switching positions to the road map to create the travel route map M (refer to FIG. 3) based on the vehicle information database 202, the intervention factor database 204, and the map database 205. Here, in the travel route map M, the driving mode switching positions that have been added to the road map are written and registered so that it is possible to identify whether any given driving mode switching position is due to a "ubiquitous event" (● mark) or an "unexpected event" (○ mark), as is the case in the first embodiment. In addition, as information regarding the driving mode switching positions provided in the travel route map M, in addition to information regarding ubiquitous events and unexpected events, information regarding the vehicle orientation is also provided.

Next, the method for registering/deleting driving mode switching positions (● marks, ○ marks) will be described. Registration of the driving mode switching positions (● marks, ○ marks) in the road map is carried out by inputting data regarding the driving mode switching position from among the vast amount of vehicle information data stored in the probe information data server 1, and then analyzing the intervention factors. Regarding the already-registered driving mode switching positions (● marks, ○ marks), when any one of the following conditions is met, information regarding the driving mode switching positions (● marks, ○ marks) is deleted from the travel route map M.

(a) When the driving mode switching positions (● marks, ○ marks) are registered in the travel route map M, after an arbitrary period of time has elapsed since the registration, the information regarding the driving mode switching positions (● marks, ○ marks) is deleted (lapse of arbitrary period condition). The arbitrary period of time is determined in accordance with the cause of the override; it is determined in accordance with the length of the intervention factor causing the switching of the driving mode, such as determining a short period in the case of a traffic accident, etc., and determining the period to the end of construction in the case of a road construction, etc.

(b) When the driving mode switching positions (● marks, ○ marks) are registered in the travel route map M, the number of the large quantity of autonomous driving vehicles included in the probe information system that have passed through in autonomous driving mode is counted, and when the count exceeds a prescribed threshold value, the information related to driving mode switching positions (● marks, ○ marks) is deleted (passing vehicle count condition). The prescribed threshold value of the count is set such that it is possible to infer that the probability of vehicles passing through while the autonomous driving mode is maintained has increased, and that the cause of the switching of the driving mode has been resolved.

(c) When a deletion operation for deleting a driving mode switching position (● mark, ○ mark) is input to a remote control unit 902 based on a determination of the control operator MO, information regarding the driving mode switching position to be deleted is deleted (operator deletion operation condition).

The method for deleting the driving mode switching positions (● marks, ○ marks) described above in the travel route map creation unit 206 of the second embodiment can, of course, be applied to the travel route map creation unit 206 of the first embodiment.

When the user position UP and the location information of the destination DP are input from the control operator operating device 9 via the communication unit 210 based on a dispatch request from the mobile terminal 4, the travel route calculation unit 208 starts the calculation of the travel route. Here, when the travel route is calculated, in the same manner as in the first embodiment, the travel route map M is referenced to calculate a route that avoids the driving mode switching positions (● marks, ○ marks).

The communication unit 210 transmits and receives an exchange of information between the vehicle dispatch information data server 2' and the probe information data server 1, or between the vehicle dispatch information data server 2' and the control operator operating device 9. Here, when the travel route calculation unit 208 successfully calculates a travel route that avoids the driving mode switching positions, the communication unit 210 transmits to the control operator operating device 9 information for displaying the travel route for which the calculation succeeded on the monitor screen.

Figure 12:
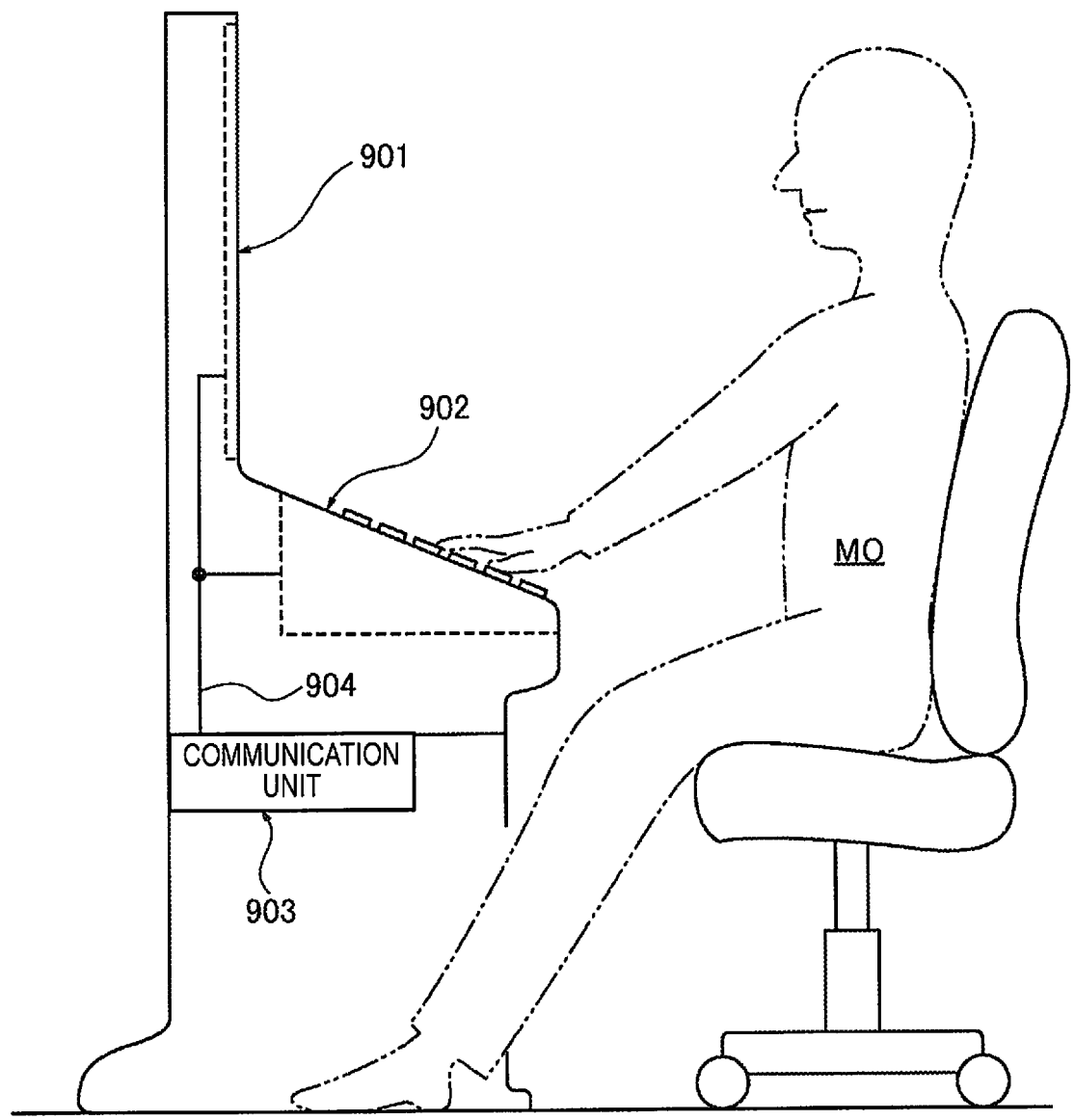
FIG. 12 is an explanatory diagram illustrating the configuration of a control operator operating device provided in the vehicle dispatch management center in the vehicle travel route control system.

Device Configuration of the Control Operator Operating Device (FIG. 12)

FIG. 12 shows a configuration of the control operator operating device 9 provided in the vehicle dispatch management center 8 in the vehicle travel route control system. The detailed configuration of the control operator operating device 9 will be described below with reference to FIG. 12.

The control operator operating device 9 includes a dispatch management monitor 901, the remote control unit 902, and a communication unit 903. The constituent elements of the control operator operating device 9 are interconnected so as to be capable of exchanging information by using a CAN communication cable 904, etc.

The dispatch management monitor 901 presents the travel route calculation result from the vehicle dispatch information data server 2' on the monitor screen monitored by the control operator MO. That is, once the travel route of the dispatch vehicle candidate has been successfully calculated, the vehicle dispatch information data server 2' draws the travel route on the road map and creates a travel route information display image having the result of the mode switch factor analysis and the orientation of the vehicle as a message. Then, when the travel route information display image is received from the vehicle dispatch information data server 2' via the communication unit 903, the travel route image is presented on the monitor screen of the dispatch management monitor 901.

The remote control unit 902 creates or corrects the travel route information by using a remote control input based on the determination of the control operator MO monitoring the monitor screen. The processing methods for creating or correcting the travel route information are listed below.

(a) It shall be assumed, for example, that a travel route that avoids the driving mode switching positions is presented on the monitor screen, and a permission operation is input to the remote control unit 902 based on the determination of the control operator MO. Here, the dispatch vehicle candidate in accordance with the presented route is set as the dispatch vehicle 7, and the presented route is transmitted as the travel route information to the on-board unit 3 mounted in the dispatch vehicle 7.

(b) It shall be assumed, for example, that a travel route that avoids the driving mode switching positions is presented on the monitor screen, and an operation to correct the presentation route is input to the remote control unit 902 based on the determination of the control operator MO. Here, the dispatch vehicle candidate in accordance with the presented route is set as the dispatch vehicle 7, and the corrected travel route is transmitted as the travel route information to the on-board unit 3 mounted in the dispatch vehicle 7.

(c) It shall be assumed, for example, that a plurality of travel routes that avoid the driving mode switching positions are presented on the monitor screen, and a selection operation for selecting one presented route from among the plurality of presented routes is input to the remote control unit 902 based on the determination of the control operator MO. Here, the dispatch vehicle candidate in accordance with the presented route is set as the dispatch vehicle 7, and the selected presented route is transmitted as the travel route information to the on-board unit 3 mounted in the dispatch vehicle 7.

(d) It shall be assumed, for example, that a travel route that avoids the driving mode switching positions is presented on the monitor screen, and an operation to change the boarding location is input to the remote control unit 902 based on the determination of the control operator MO. Here, a corrected route for the dispatch vehicle candidate that avoids the driving mode switching positions via the changed boarding location is created.

(e) In the case that there are unmanned vehicles and manned vehicles as dispatch vehicle candidates, when both of the two types of vehicles can be dispatched with respect to a dispatch request, and when there are no driving mode switching positions on the travel route, an unmanned vehicle is preferentially dispatched.

(f) If there are unmanned and manned vehicles as dispatch vehicle candidates, when both of the two types of vehicles can be dispatched with respect to a dispatch request, and when there are driving mode switching positions on the travel route, a manned vehicle is preferentially dispatched.

The control operator MO monitors the travel situations and the surrounding conditions of the plurality of dispatch vehicles 7*n* while viewing the monitor screen, in the same manner as in the first embodiment, and, for example, if there is the dispatch vehicle 7 that is switched from autonomous driving mode to manual driving mode, the work to create a remote control intervention signal is also carried out, such as the work for changing the travel route of the dispatch vehicle 7, using the remote control unit 209.

The communication unit 903 transmits and receives an information exchange between the control operator operating device 9 and the mobile terminal 4, or between the control operator operating device 9 and the on-board unit 3.

When the travel route of the dispatch vehicle 7 is created or corrected by the remote control unit 902, the communication unit 903 transmits travel route information to the on-board unit 3 for directing the dispatch vehicle 7 to travel along the created or corrected travel route. In addition, when the travel route of the dispatch vehicle 7 is created or corrected, the communication unit 903 sends travel route information that includes a signal instructing the on-board unit 3 and the mobile terminal 4 to display the road map on which the travel route is drawn and the mode switch factor analysis result message. Additionally, when a dispatch request is received from the mobile terminal 4, the communication unit 903 transmits the location of the user which made the dispatch request and the location information of the destination to the vehicle dispatch information data server 2'.

Next, the operation of the second embodiment will be described separately with respect to the "already-registered driving mode switching position information deletion operation" and the "operation of the travel route information creation process."

Figure 13:
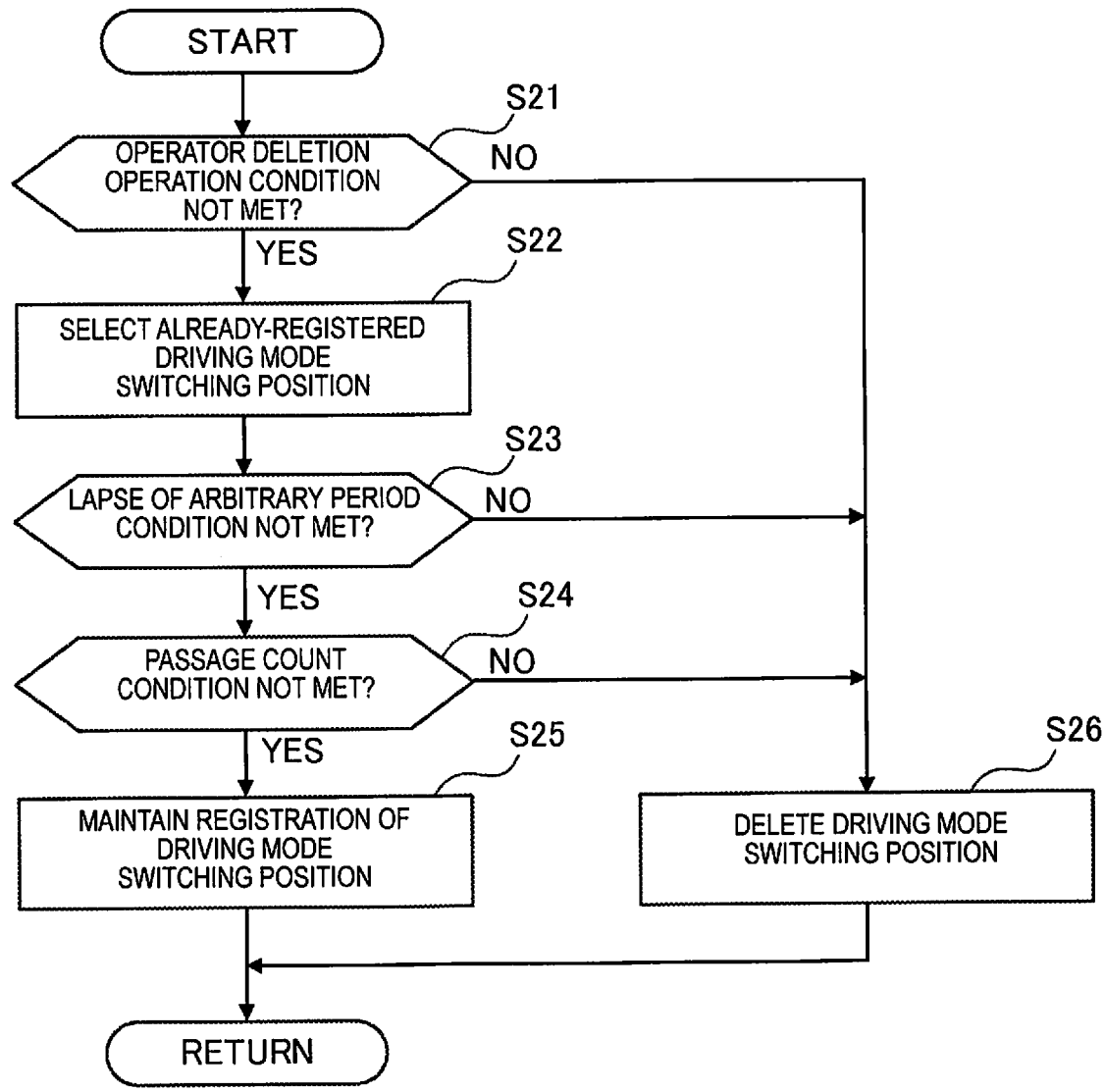
FIG. 13 is a flowchart illustrating the process for deleting driving mode switching position information executed in a travel route map creation unit of the vehicle dispatch information data server.

Already-Registered Driving Mode Switching Position Information Deletion Operation (FIG. 13)

FIG. 13 shows the process flow for deletion of driving mode switching position information executed by the travel route map creation unit 206 of the vehicle dispatch information data server 2'. The already-registered driving mode switching position information deletion operation will be described below with reference to FIG. 13.

First, it is determined whether an operator deletion operation condition for deleting the driving mode switching positions based on the determination of the control operator MO has not been met (S21). If the operator deletion operation condition for deleting the driving mode switching positions has not been met, the process proceeds to Step S22. On the other hand, if an operator deletion operation condition for deleting the driving mode switching positions based on the determination of the control operator MO has been met, the process proceeds to Step S26.

Next, if the operator deletion operation condition has not been met in Step S21, the driving mode switching positions that are already registered in the travel route map M to be deleted are sequentially switched and selected (S22). Then, it is determined whether the condition that an arbitrary period of time has elapsed after the target driving mode switching positions are registered has not been met (S23). If the arbitrary period has not elapsed since registration and thus the lapse of arbitrary period condition has not been met, the process proceeds to Step S24; and if the lapse of arbitrary period condition that the arbitrary period has elapsed since registration has been met, the process proceeds to Step S26.

Following the determination that the lapse of arbitrary period condition has not been met in Step S23, it is determined whether a passing vehicle count condition, based on the number of the large quantity of autonomous driving vehicles, which are included in the probe information system that have passed through while in autonomous driving mode, has not been met (S24). If the count is at or below a prescribed threshold value and the passing vehicle count condition has not been met, the process proceeds to Step S25, and if the count exceeds the prescribed threshold value and the passing vehicle count condition has been met, the process proceeds to Step S26.

In Step S25, when it is determined that none of the operator deletion operation condition, the lapse of arbitrary period condition, and the passing vehicle count condition has been met, the registration of the driving mode switching positions already registered in the travel route map M are maintained unchanged, and the process proceeds to RETURN. On the other hand, if it is determined that any one of the operator deletion operation condition, the lapse of arbitrary period condition, or the passing vehicle count condition has been met, the process proceeds to Step S26, and in Step S26, the driving mode switching position that is the subject of determination is deleted from the driving mode switching positions already registered in the travel route map M, and the process proceeds to RETURN.

In this manner, when the operator deletion operation condition is met, an operation to delete the driving mode switching positions based on the determination of the control operator MO is carried out, and the corresponding driving mode switching position information is deleted (S21-S26).

For example, even if there is a section under construction, or a guide who guides vehicles or a temporary white line that has been drawn, it can be said that travel environment conditions for an autonomous driving vehicle that travels while the autonomous driving mode is maintained are in place. For this reason, if the travel environment is such that conditions for an autonomous driving vehicle to travel in the autonomous driving mode are in place, the information regarding the registered driving mode switching positions can be deleted at the discretion of the control operator MO.

In addition, if the driving mode switching positions are registered in the travel route map M, when an arbitrary period of time has elapsed since the registration has elapsed, the lapse of arbitrary period condition is met, and after the arbitrary period has elapsed, the information regarding the driving mode switching positions is deleted (S21→S22→S23→S26).

For example, when the cause of intervention is a traffic accident, etc., after a short arbitrary period of time has elapsed, the probability of a driving mode switching position being deleted is eliminated; thus, the information regarding the driving mode switching positions is deleted. For example, in the case that road construction, etc., is the cause of intervention, the probability of a driving mode switching position being deleted is eliminated when the construction ends; thus, the information regarding the driving mode switching positions is deleted. For this reason, it becomes possible to appropriately delete the information regarding the mode switching positions, which is needed until an arbitrary period of time has elapsed, but is no longer after the arbitrary period of time has elapsed.

Moreover, if the driving mode switching positions are registered in the travel route map M, the number of the large quantity of autonomous driving vehicles that are included in the probe information system that have passed through while in autonomous driving mode is counted, and when the count exceeds a prescribed threshold value, the passing vehicle count condition is met, and the information regarding the driving mode switching positions is deleted (S21→S22→S23→S24→S26).

For example, if an already-registered driving mode switching position has been repeatedly and consecutively passed through while in autonomous driving mode a prescribed number of times, it can be inferred that the cause that brought about the driving mode switching position has been resolved. Then, if the same already-registered driving mode switching position is passed through again, the probability of the position being passing through while in the autonomous driving mode becomes high. For this reason, by deleting the position for which it can be inferred that the cause that brought about the driving mode switching position has been resolved, the number of driving mode switching positions in the travel route map M decreases, and the probability of successfully calculating the travel route can be increased.

Figure 14:
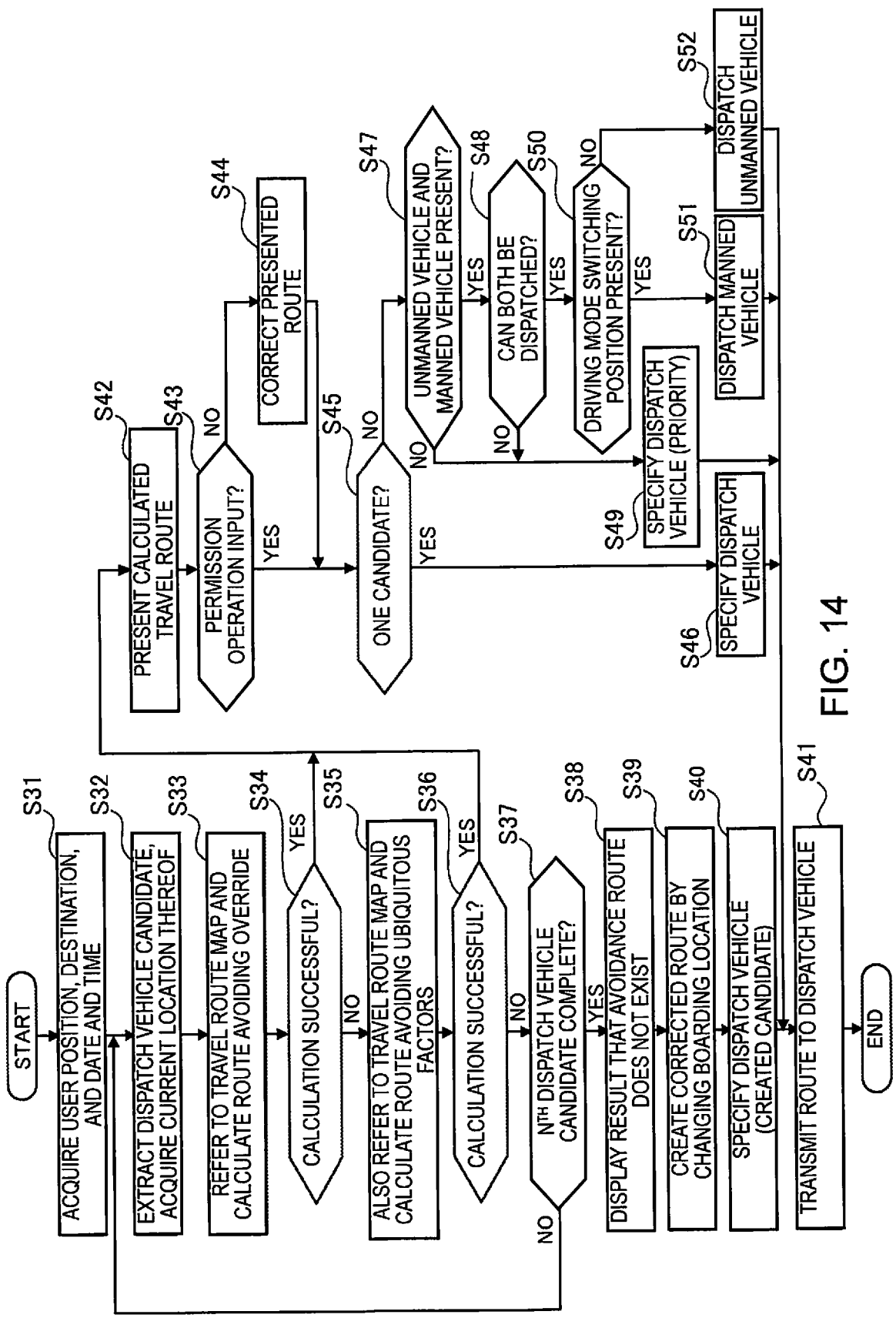
FIG. 14 is a flowchart illustrating the process for creating or correcting travel route information executed in a travel route calculation unit and a control operator operating device of the vehicle dispatch information data server.

Operation of the Travel Route Information Creation Process (FIG. 14)

FIG. 14 shows the process flow for creating or correcting travel route information executed by the travel route calculation unit 208 and the control operator operating device 9 of the vehicle dispatch information data server 2'. The operation of the travel route information creation process will be described below with reference to FIG. 14.

When a dispatch request is received from the mobile terminal 4, the location information of the mobile terminal 4 (user position information), the location information of the destination, and the date and time information are acquired (S31). Next, the first dispatch vehicle candidate 7-1 is extracted as the first dispatch vehicle candidate, and the location information of the dispatch vehicle candidate at the extracted timing is acquired (S32). Next, the travel route map M that has intervention factor information is selected based on the date and time information when the dispatch request was received. Then, the travel route map M is referenced, and a route that avoids the driving mode switching positions (● marks, ○ marks) is calculated as the travel route of the dispatch vehicle candidate from a plurality of routes that pass from the current location to the destination via the boarding location (S33). If a route that avoids the driving mode switching positions is successfully calculated (YES in S34), the process proceeds to Step S42.

On the other hand, if a travel route that avoids the driving mode switching positions is not successfully calculated (NO in S34), the travel route map M that has intervention factor information is referenced, and a route that avoids the driving mode switching positions due to ubiquitous events (● marks) while allowing for the presence of driving mode switching positions due to unexpected events (○ marks) is calculated as the travel route of the dispatch vehicle 7 (S35). If a route that avoids the driving mode switching positions due to ubiquitous events (● marks) is successfully calculated (YES in S36), the process proceeds to Step S42.

In addition, if a route that avoids the driving mode switching positions due to ubiquitous events (● marks) is not successfully calculated (NO in S36), it is determined whether the route calculation for the last nth dispatch vehicle candidate 7-n has been completed (S37). If only the route calculation of the first dispatch vehicle candidate 7-1 has been completed (NO in S37), the dispatch vehicle candidate is switched to the second dispatch vehicle candidate 7-2, the process returns to S32 and proceeds from S33→S34→S35→S36, to re-execute the travel route calculation process.

Then, if the route calculation process for the nth dispatch vehicle candidate 7-n is completed without the travel route being calculated, even if re-calculation is repeated (YES in S37), a calculation result that a travel route that avoids the driving mode switching positions does not exist is displayed on the monitor screen of the control operator operating device 9 (S38). Then, the boarding location, which is the meeting place with the user, is changed by using a remote intervention operation to the remote control unit 902, to correct the travel route for travel from the current location to the destination via the changed boarding location (S39). When a corrected route, which is a travel route that has been corrected, is created, the dispatch vehicle candidate which for which the corrected route was created is set as the dispatch vehicle 7 (S40). Then, travel route information for travel in accordance with the created corrected route is transmitted to the on-board unit 3 of the dispatch vehicle 7 (S41), and the process proceeds to END. At this time, the user is notified that the boarding location has been changed.

When the calculation of the travel route is successful in Step S34 or Step S36, the process proceeds to Step S42, and, in Step S42, the travel route that avoids the driving mode switching positions is presented on the monitor screen of the control operator operating device 9, and it is determined whether a permission operation has been input to the remote control unit 902 by the control operator MO who monitors the monitor screen (S43). If a plurality of routes are presented on the monitor screen, the control operator MO selects one of the presented routes from the plurality of presented routes, and inputs a permission operation.

If there is no input of a permission operation in Step S43 and an operation to correct the presented route is input based on the determination of the control operator MO, the presented route is corrected (S44). In the case that a correction operation has been input, if it is determined that there is one dispatch vehicle candidate (YES in S45), this candidate is specified as the dispatch vehicle 7 (S46), the corrected travel route is transmitted to the on-board unit 3 of the dispatch vehicle 7 as the travel route information (S41), and the process proceeds to END. In the case that a permission operation is input in Step S43, if it is determined that there is one dispatch vehicle candidate (YES in S45), this candidate is specified as the dispatch vehicle 7 (S46), the travel route information of the presented route is transmitted to the on-board unit 3 of the dispatch vehicle 7 (S41), and the process proceeds to END.

If it is determined that there is a plurality of dispatch vehicle candidates in Step S45 (NO in S45), it is determined whether there are manned vehicles and unmanned vehicles in the dispatch vehicle candidates (S47), and it is determined whether both the manned vehicles and the unmanned vehicles can be dispatched (S48). If the dispatch vehicle candidates do not include both manned vehicles and unmanned vehicles (NO in S47), or if both the manned vehicles and unmanned vehicles cannot be dispatched (NO in S48), the process proceeds to Step S49, a priority candidate from among the plurality of dispatch vehicle candidates is specified as the dispatch vehicle 7 (S46), travel route information for travel in accordance with the presented route is transmitted to the on-board unit 3 of the dispatch vehicle 7 (S41), and the process proceeds to END. Here, a priority candidate means that, in the case of successful calculations in steps S34 and S36, a successfully calculated dispatch vehicle candidate in Step S34 is prioritized. In the case of successful calculations in either Step S34 or Step S36, the order of priority is followed.

On the other hand, if there are unmanned vehicles and manned vehicles among the dispatch vehicle candidates (YES in S47) and both the unmanned vehicles and manned vehicles can be dispatched (YES in S48), the process proceeds to Step S50, and it is determined whether there are driving mode switching positions including ubiquitous factors and unexpected factors. If it is determined that the driving mode switching positions are present, a manned vehicle from among the unmanned and manned dispatch vehicle candidates is specified as the dispatch vehicle 7 (S51), and if it is determined that a driving mode switching position is not present, an unmanned vehicle from among the unmanned and manned dispatch vehicle candidates is specified as the dispatch vehicle 7 (S52). Then, travel route information for travel in accordance with the presented route is transmitted to the on-board unit 3 of the corresponding dispatch vehicle 7 (S41), and the process proceeds to END.

In this manner, in the case that a travel route that avoids the driving mode switching positions is presented on the monitor screen, when a permission operation is input to the remote control unit 902, the dispatch vehicle candidate in accordance with the presented route is set as the dispatch vehicle 7. The presented route is then transmitted to the on-board unit 3 mounted in the dispatch vehicle 7 as the travel route information (S42→S43→S45→S46→S41→END).

That is, the present travel route management system is a system that analyzes past events (driving mode switching positions). For this reason, it may not be able to cope with future events. For example, in the case in which the control operator MO quickly obtains road closure information due to a traffic accident from a link system, the timing at which this information is reflected in the present travel route management system is delayed. On the other hand, if the control operator MO determines the final travel route after determining whether there are no problems with traveling on the presented routes, the knowledge information of the control operator MO is reflected with good responsiveness, and it becomes possible to transmit appropriate travel route information that can cope with future events to the dispatch vehicle 7.

In the case that a travel route that avoids the driving mode switching positions is presented on the monitor screen, when an operation to correct the presented route is input to the remote control unit 902, the corrected travel route is transmitted as the travel route information (S42→S43→S44→S45→S46→S41→END).

That is, if the control operator MO corrects the presented route based on the determination of the control operator MO that there is a problem with traveling on the presented route, the corrected route is transmitted as the travel route information. For this reason, it is possible to transmit travel route information to the dispatch vehicle 7 that prioritizes the correction operation by the control operator MO corresponding to future events.

In the case that a plurality of travel routes that avoid the driving mode switching positions are presented on the monitor screen, when an operation to select one presented route from the plurality of presented routes is input, the selected presented route is transmitted as the travel route information (S42→S43).

That is, the control operator MO determines whether there is a problem with traveling on each of the plurality of presented routes. For this reason, when a plurality of travel routes that avoid the driving mode switching positions are presented on the monitor screen, it is possible for the determination of the control operator MO corresponding to future events to be reflected in each of the dispatch vehicle candidates.

In the case that a calculation result that a travel route that avoids the driving mode switching positions does not exist is displayed on the monitor screen, the boarding location, which is the meeting location with the user, is changed by using an operation of the control operator MO. The travel route is then corrected for travel from the current location to the destination via the changed boarding location, and the corrected travel route is transmitted as the travel route information (S37→S38→S39→S40→S41→END).

That is, in the case that a calculation result that a travel route that avoids the driving mode switching positions does not exist is displayed, the control operator MO changes the boarding location in an attempt to correct the travel route. For this reason, even in the case that a calculation result that a travel route that avoids the driving mode switching positions does not exist is presented, it is possible to transmit travel route information that can avoid the driving mode switching positions by using an operation by the control operator MO to change the boarding location.

In the case that there are unmanned vehicles and manned vehicles as the dispatch vehicle candidates, when both of the two types of vehicles can be dispatched with respect to a dispatch request, and when there are no driving mode switching positions on the travel route, an unmanned vehicle is preferentially dispatched (S45→S47→S48→S50→S52→S41→END).

That is, if there is no driving mode switching position on the travel route, there is a higher probability of completing the travel route compared with the case in which there are driving mode switching positions on the travel route. Thus, in the case that both unmanned vehicles and manned vehicles that are present as dispatch vehicle candidates can be dispatched, if there is no driving mode switching position on the travel route, it is possible to preferentially dispatch an unmanned vehicle, which is lower in cost compared to a manned vehicle.

In the case that there are unmanned vehicles and manned vehicles as the dispatch vehicle candidates, when both of the two types of vehicles can be dispatched with respect to a dispatch request, and when there is a driving mode switching position on the travel route, a manned vehicle is preferentially dispatched (S45→S47→S48→S50→S51→S41→END).

That is, if there are driving mode switching positions on the travel route, there is a lower probability of completing the travel route compared with a case in which there is no driving mode switching position on the travel route. Thus, in the case that it is determined that both unmanned vehicles and manned vehicles that are present as dispatch vehicle candidates can be dispatched, if there are driving mode switching positions on the travel route, it is possible to preferentially dispatch a manned vehicle, which can ensure the ability to complete the travel by using an intervention of manual operation by the driver.

As described above, the following effects are exhibited by the vehicle travel route control system, the vehicle travel route control device, and the vehicle travel route control method according to claim 2.

(10) A vehicle travel route control system that controls a plurality of vehicles having an autonomous driving function or a driving assist function, comprising a user terminal (mobile terminal 4) that sends a dispatch request to a destination, a vehicle dispatch controller (vehicle dispatch information data server 2') that, when the dispatch request is received, extracts a dispatch vehicle candidate from the plurality of vehicles and calculates a travel route for the dispatch vehicle candidate, the control operator operating device 9 including the dispatch management monitor 901 that presents a travel route of the dispatch vehicle candidate calculated in the vehicle dispatch controller (vehicle dispatch information data server 2') on a monitor screen and the remote control unit 902 that creates or corrects the travel route information by using a remote control input based on a determination of the control operator MO, and an on-board terminal (on-board unit 3) mounted in each of a plurality of vehicles and receives the travel route information from the control operator operating device 9, wherein the vehicle dispatch controller (vehicle dispatch information data server 2') creates a travel route map M, in which information regarding driving mode switching positions (● marks, ○ marks) at which vehicles switched over to a manual driving mode during travel in an autonomous driving mode, which is the driving mode by using the autonomous driving function or the driving assist function of the vehicle, have been added to a road map, a travel route is calculated which avoids the driving mode switching positions (● marks, ○ marks), from a plurality of routes on which the dispatch vehicle candidate travels to the destination via a boarding location, based on the travel route map M and position information of the dispatch vehicle candidate at the extracted timing, and in the case that a travel route that avoids the driving mode switching positions (● marks, ○ marks) is presented on the monitor screen, if a permission operation is input to the remote control unit 902, the control operator operating device 9 sets the dispatch vehicle candidate in accordance with the presented route as the dispatch vehicle 7 and transmits the presented route to the on-board terminal (on-board unit 3) mounted in the dispatch vehicle 7 as the travel route information. Thus, it is possible to propose a vehicle travel route control system that can reduce the system monitoring load by using route calculation that improves travel route completion reliability and the creation of the travel route information, when the plurality of dispatch vehicles 7n are centrally managed. In addition, when the travel route information is transmitted, it is possible to transmit appropriate travel route information that can cope with future events to the dispatch vehicle 7 through a remote control input from the control operator MO.

(11) In the case that a travel route that avoids the driving mode switching positions (● marks, ○ marks) is presented on the monitor screen, if an operation to correct the presented route is input to the remote control unit 902, the control operator operating device 9 sets the dispatch vehicle candidate in accordance with the presented route as the dispatch vehicle 7 and transmits the corrected travel route to the on-board terminal (on-board unit 3) mounted in the dispatch vehicle 7 as the travel route information. For this reason, it is possible to transmit travel route information to the dispatch vehicle 7 that prioritizes the remote control input by the control operator MO corresponding to future events.

(12) In the case that a plurality of travel routes that avoid the driving mode switching positions (● marks, ○ marks) are presented on the monitor screen, if a selection operation for selecting one route from a plurality of presented routes is input to the remote control unit 902, the control operator operating device 9 sets the dispatch vehicle candidate in accordance with the selected presented route as the dispatch vehicle 7 and transmits the selected presented route to the on-board terminal (on-board unit 3) mounted in the dispatch vehicle 7 as the travel route information. For this reason, when a plurality of travel routes that avoid the driving mode switching positions (● marks, ○ marks) are presented on the monitor screen, it is possible for the determination of the control operator MO corresponding to future events to be reflected in each of the dispatch vehicle candidates and to transmit appropriate travel route information.

(13) In the case that the monitor screen displays that a travel route that avoids the driving mode switching positions (● marks, ○ marks) does not exist, if a boarding location changing operation for changing the boarding location is input to the remote control unit 902, the control operator operating device 9 creates a corrected route for the dispatch vehicle candidate that avoids the driving mode switching positions (● marks, ○ marks) via the changed boarding location. For this reason, even in a case that it is displayed that a travel route that avoids the driving mode switching positions (● marks, ○ marks) does not exist, it is possible to transmit travel route information that can avoid the driving mode switching positions (● marks, ○ marks) by using an operation by the control operator MO to change the boarding location.

(14) When the driving mode switching positions (● marks, ○ marks) are registered in the travel route map M, after an arbitrary period of time has elapsed since the registration, the vehicle dispatch controller (vehicle dispatch information data server 2') deletes the information regarding the driving mode switching positions (● marks, ○ marks) from the travel route map M. For this reason, it becomes possible to appropriately delete, from the travel route map M, information regarding the driving mode switching positions (● marks, ○ marks), which are necessary until an arbitrary period of time elapses, but that become unnecessary after the lapse of the arbitrary period of time. As a result, the number of the driving mode switching positions (● marks, ○ marks) in the travel route map M can be decreased, and the probability of successfully calculating the travel route can be increased.

(15) When the driving mode switching positions (● marks, ○ marks) are registered in the travel route map M, the vehicle dispatch controller (vehicle dispatch information data server 2') counts the number of vehicles that have passed the registered driving mode switching positions (● marks, ○ marks) while in autonomous driving mode, and when the count exceeds a prescribed threshold value, deletes the information regarding the driving mode switching positions (● marks, ○ marks) from the travel route map. For this reason, it is possible to delete from the travel route map M the driving mode switching position (● mark, ○ mark) for which it can be inferred that the cause of the switching of the driving mode has been resolved. As a result, the number of the driving mode switching positions (● marks, ○ marks) in the travel route map M decreases, and the probability of successfully calculating the travel route can be increased.

(16) When a deletion operation for deleting a driving mode switching position (● mark, ○ mark) is input to a remote control unit 902, the vehicle dispatch controller (vehicle dispatch information data server 2') deletes the information regarding the driving mode switching positions (● marks, ○ marks) to be deleted from the travel route map M. For this reason, if the travel environment is such that conditions for travel in the autonomous driving mode are in place, the information regarding the registered driving mode switching positions (● marks, ○ marks) can be promptly deleted at the discretion of the control operator MO.

(17) The vehicle dispatch information data server 2' also has information regarding the vehicle orientation as information regarding the driving mode switching positions (● marks, ○ marks) provided in the travel route map M. As a result, when the travel route that avoids the driving mode switching positions (● marks, ○ marks) is calculated, the probability of successfully calculating the travel route can be increased. For example, in the case that a position becomes a driving mode switching position (● mark, ○ mark) only during travel in a direction toward the afternoon sun, the position does not become a driving mode switching position (● mark, ○ mark) when the vehicle travels in a direction away from the afternoon sun. Thus, by having the vehicle orientation information, the probability of successfully calculating the travel route that avoids the driving mode switching positions (● marks, ○ marks) is increased.

(18) In the case that there are unmanned vehicles and manned vehicles as the dispatch vehicle candidates, when both of the two types of vehicles can be dispatched with respect to a dispatch request, and when there are no driving mode switching positions (● marks, ○ marks) on the travel route, the control operator operating device 9 preferentially dispatches an unmanned vehicle. Thus, in the case that it is determined that both unmanned vehicles and manned vehicles that are present as dispatch vehicle candidates can be dispatched, if there are no driving mode switching positions (● marks, ○ marks) on the travel route, it is possible to preferentially dispatch an unmanned vehicle at lower cost.

(19) When there are unmanned vehicles and manned vehicles as dispatch vehicle candidates, if both of the two types of vehicles can be dispatched with respect to a dispatch request, and if there are driving mode switching positions (● marks, ○ marks) on the travel route, the control operator operating device 9 preferentially dispatches a manned vehicle. Thus, in the case that it is determined that both unmanned vehicles and manned vehicles that are present as dispatch vehicle candidates can be dispatched, if there are driving mode switching positions (● marks, ○ marks) on the travel route, it is possible to preferentially dispatch a manned vehicle, which can ensure the ability of completing travel while avoiding unnecessary stops.

(20) A vehicle travel route control device that controls a plurality of vehicles having an autonomous driving function or a driving assist function, comprising the vehicle information database 202 that stores information regarding driving mode switching positions (● marks, ○ marks) at which vehicles switched over during travel to the manual driving mode from the autonomous driving mode, that is, the driving mode realized by use of an autonomous driving function or a driving assist function of a vehicle, the travel route map creation unit 206 that creates the travel route map M, in which the driving mode switching positions (● marks, ○ marks) are added to a road map based on the vehicle information database 202, the position information acquisition unit 207 that, when a dispatch request is received, acquires boarding location and position information of the destination DP, extracts a dispatch vehicle candidate from among a plurality of vehicles, and acquires location information of the dispatch vehicle candidate at the extracted timing, the travel route calculation unit 208 that calculates a route that avoids the driving mode switching positions (● marks, ○ marks) from among a plurality of routes on which the dispatch vehicle candidate travels to the destination DP via the boarding location, based on the travel route map M and the position information (current location VP) of the dispatch vehicle candidate, the dispatch management monitor 901 that, when a travel route that avoids the driving mode switching positions (● marks, ○ marks) is calculated, presents the calculated travel route on the monitor screen, the remote control unit 902 that, when the travel route is presented on the monitor screen, inputs a remote control by the control operator MO that monitors the monitor screen, and the communication unit 903 that, when the travel route is created or corrected by using the remote control input, sets the dispatch vehicle candidate that travels the created or corrected route as the dispatch vehicle 7, and transmits the created or corrected route to the on-board terminal (on-board unit 3) mounted in the dispatch vehicle 7 as the travel route information. Thus, a vehicle travel route control device can be proposed that can reduce the system monitoring load by using route calculation that improves travel route completion reliability and the creation of the travel route information, when the plurality of dispatch vehicles 7*n* are centrally managed. In addition, it is possible to transmit appropriate travel route information that can cope with future events to the dispatch vehicle 7 by using a remote control input based on a determination of the control operator MO.

(21) A vehicle travel route control method realized by using intercommunication among a vehicle dispatch controller (vehicle dispatch information data server 2') for controlling a plurality of vehicles having an autonomous driving function or a driving assist function, the control operator operating device 9 that has the dispatch management monitor 901 and the remote control unit 902, on-board terminals (on-board unit 3) mounted in a plurality of vehicles, and user terminals (mobile terminal 4), comprising the vehicle dispatch controller (vehicle dispatch information data server 2') and the control operator operating device 9 creating the travel route map M, in which driving mode switching positions (● marks, ○ marks) at which vehicles switched over during travel to a manual driving mode from autonomous driving mode, which is the driving mode by using the autonomous driving function or the driving assist function of the vehicle, have been added to a road map, acquiring boarding location and position information of the destination DP, extracting a dispatch vehicle candidate from among a plurality of vehicles, and acquiring location information of the dispatch vehicle candidate at the extracted timing, when a dispatch request is received from the user terminal (mobile terminal 4), calculating a route, which avoids the driving mode switching positions (● marks, ○ marks) from among a plurality of routes on which the dispatch vehicle candidate travels to the destination DP via a boarding location, based on the travel route map M and position information of the dispatch vehicle candidate, presenting, when a travel route that avoids the driving mode switching positions (● marks, ○ marks) is calculated, the calculated travel route on the monitor screen of the dispatch management monitor 901, creating or correcting the travel route by using a remote control input to the remote control unit 902, when the travel route is presented on the monitor screen, and setting, when the travel route is created or corrected, the dispatch vehicle candidate that travels on the created or corrected route as the dispatch vehicle 7, and transmitting the travel route information to the on-board terminal (on-board unit 3) mounted in the dispatch vehicle 7. Thus, it is possible to propose a vehicle travel route control method that can reduce the system monitoring load by using route calculation that improves travel route completion reliability and the creation of the travel route information, when the plurality of dispatch vehicles 7n are centrally managed. In addition, it is possible to transmit appropriate travel route information that can cope with future events to the dispatch vehicle 7 by using a remote control input based on a determination of the control operator MO.

The vehicle travel route control system, the vehicle travel route control device, and the vehicle travel route control method according to the present disclosure have been described based on the first and second embodiments. However, specific configurations are not limited to these embodiments and various modifications and additions to the design can be made without departing from the scope of the invention according to each claim in the Claims.

In the first embodiment, an example was shown in which all management functions, including remote control, are shared in the vehicle dispatch information data server 2 that receives a dispatch request from the mobile terminal 4 (user terminal). However, at least one of the travel route map creation function, the location information acquisition function, and the dispatch vehicle travel route calculation function may be assigned to the probe information data server 1 of the vehicle dispatch management center 8, the on-board unit (on-board terminal) of the dispatch vehicle 7, or another unit.

In the second embodiment, an example was shown in which the vehicle dispatch information data server 2' has all of the functions for calculating the travel route, and the control operator operating device 9 installed in the vehicle dispatch management center 8 has all of the functions for managing the vehicle dispatch information network. However, the vehicle dispatch information data server may be provided with some of the management functions of the control operator operating device, and the control operator operating device installed in the vehicle dispatch management center may be provided with some of the functions of travel route calculation by the vehicle dispatch information data server.

The first and second embodiments have the probe information data server 1 of the probe information system that receives vehicle information data from the probe vehicle group 6. And an example was shown in which the vehicle dispatch information data servers 2, 2' acquire information regarding the driving mode switching positions by extracting from the vehicle information data acquired by the probe information data server 1 the positions at which a large number of autonomous driving vehicles switched over from autonomous driving mode to manual driving mode. However, the vehicle dispatch information data server may acquire information regarding the driving mode switching positions at which a plurality of dispatch vehicles belonging to the vehicle dispatch service switched over from autonomous driving mode to manual driving mode. In addition, the vehicle dispatch information data server may acquire information regarding the driving mode switching positions at which autonomous driving vehicles traveling in a vehicle dispatch service section switched over from autonomous driving mode to manual driving mode.

In the first and second embodiments, an example of a vehicle travel route control system, realized by using a vehicle dispatch information network, that controls a plurality of dispatch vehicles having an autonomous driving function or a driving assist function, was shown. However, in regard to the plurality of dispatch vehicles, a plurality of dispatch vehicles having a driving assist function may be managed, or a plurality of dispatch vehicles, where dispatch vehicles having an autonomous driving function and dispatch vehicles having a driving assist function coexist, can be managed.

The invention claimed is:
1. A vehicle travel route control device comprising:
 a vehicle dispatch controller configured to
  obtain information on a dispatch request to a destination,
  extract a dispatch vehicle candidate based on the dispatch request from a plurality of dispatch vehicle candidates,
  (a) obtain position information of the dispatch vehicle candidate,
  (b) create a travel route map for travel in which information has been obtained and added to a road map regarding a driving mode switching position at which a vehicle during travel switched over to a manual driving mode from an autonomous driving mode that is a driving mode realized by use of an autonomous driving function or a driving assist function of the vehicle has been obtained and added to a road map, the information regarding the driving mode switching position being acquired from a plurality of vehicles, (c) calculate a travel route that avoids the driving mode switching position from at least one route on which the dispatch vehicle candidate travels to the destination via a boarding location based on the travel route map for travel, the position information of the dispatch vehicle candidate at an extracted timing, and (d) transmit the travel route that has been calculated to the dispatch vehicle candidate upon determining that the calculated travel route avoids the driving mode switching position, upon determining that the calculated travel route for the dispatch vehicle candidate does not avoid the driving mode switching position, repeating steps (a) through (d) for another one of the plurality of dispatch vehicle candidates until the travel route calculated for the dispatch vehicle candidate avoids the driving mode switching position, the vehicle dispatch controller being disposed externally of the plurality of dispatch vehicle candidates.

2. The vehicle travel route control device according to claim 1, wherein the vehicle dispatch controller is configured to analyze intervention factors that caused a switch during travel to the manual driving mode from the autonomous driving mode, intervention factor information is added to the travel route map regarding whether the driving mode switching position is a driving mode switching position due to ubiquitous events or a driving mode switching position due to temporary unexpected events based on an analysis result of the intervention factors, and upon determining the travel route that avoids the driving mode switching position cannot be calculated, the travel route map that has the intervention factor information is referenced, and a route is calculated that allows for a presence of the driving mode switching position due to unexpected events but avoids the driving mode switching position due to ubiquitous events as the travel route of the dispatch vehicle candidate.

3. The vehicle travel route control device according to claim 2, wherein upon determining the plurality of dispatch vehicle candidates that can be selected based on location information of the destination, the vehicle dispatch controller calculates the travel route by switching the plurality of dispatch vehicle candidates in order of priority.

4. The vehicle travel route control device according to claim 1, wherein the vehicle dispatch controller is configured to acquire information regarding the driving mode switching position at which the vehicle switched during travel to the manual driving mode from the autonomous driving mode along with date and time information, including weekday or holiday and time of day, the vehicle dispatch controller is configured to create the travel route map in which the driving mode switching position is added to the road map separated by the weekday or the holiday and the time of day when the driving mode switching position and the date and time information are acquired, and the vehicle dispatch controller is configured to acquire location information of the dispatch vehicle candidate and location information of the destination along with date and time information including the weekday or the holiday and the time of day, and the vehicle dispatch controller is configured to reference the travel route map created in correspondence with the date and time information when the travel route is calculated.

5. The vehicle travel route control device according to claim 1, wherein the vehicle dispatch controller is configured to draw the travel route on the road map when the travel route that avoids the driving mode switching position is calculated, and transmit the travel route information including a signal for displaying the road map on which the travel route is drawn to at least one of an on-board terminal and a user terminal.

6. The vehicle travel route control device according to claim 2, wherein the vehicle dispatch controller is configured to transmit the travel route information that includes a signal for displaying the intervention factor analysis result as a message to at least one of an on-board terminal and a user terminal when a route that avoids the driving mode switching position due to ubiquitous events but that allows the presence of the driving mode switching position due to unexpected events is calculated based on the travel route map that includes the intervention factor information.

7. A vehicle travel route control device that controls a first plurality of vehicles having an autonomous driving function or a driving assist function, the vehicle travel route control device comprising:

an electronic controller disposed externally of the first plurality of vehicles, the electronic controller including a vehicle information database that stores information regarding a driving mode switching position at which vehicles switched over to a manual driving mode during travel from an autonomous driving mode that is a driving mode realized by use of an autonomous driving function or a driving assist function of the vehicle, the information regarding the driving mode switching position being received from a second plurality of vehicles;

a travel route map creation unit that creates a travel route map, in which the driving mode switching position has been added to a road map, based on the vehicle information database;

a position information acquisition unit that extracts a dispatch vehicle candidate from the first plurality of vehicles when the dispatch request is received, that acquires boarding location and position information of the destination, and that acquires location information of the dispatch vehicle candidate at an extracted timing;

a travel route calculation unit that calculates a route that avoids the driving mode switching position from among a plurality of routes on which the dispatch vehicle candidate travels to the destination via the boarding location based on the travel route map and the position information of the dispatch vehicle candidate; and a communication unit that sets the dispatch vehicle candidate for which the travel route could be calculated as a dispatch vehicle and transmits the travel route information that was calculated to the dispatch vehicle when a travel route that avoids the driving mode switching position is calculated, upon determining that the calculated travel route for the dispatch vehicle candidate does not avoid the driving mode switching position, the position information acquisition unit extracts another dispatch vehicle candidate from the first plurality of vehicles when the dispatch request is received, that acquires boarding location and position information of the destination, and that acquires location information of the another dispatch vehicle candidate at an extracted timing;

the travel route calculation unit calculates a route that avoids the driving mode switching position from among a plurality of routes on which the another dispatch vehicle candidate travels to the destination via the boarding location based on the travel route map and the position information of the another dispatch vehicle candidate; and the communication unit sets the another dispatch vehicle candidate for which the travel route could be calculated as the dispatch vehicle and transmits the travel route information that was calculated to the another dispatch vehicle when a travel route that avoids the driving mode switching position is calculated.

8. The vehicle travel route control device according to claim 7, wherein the electronic controller further includes an intervention factor analysis unit that analyzes intervention factors that caused the switch during travel to the manual driving mode from the autonomous driving mode, and an intervention factor database that stores intervention factor information regarding whether the factors that caused driving mode switching position are ubiquitous events or temporary unexpected events based on the analysis result of the intervention factor analysis unit, wherein the travel route map creation unit adds to a road map the driving mode switching position that have the intervention factor information to create a travel route map, and the travel route calculation unit calculates a travel route that allows for the presence of the driving mode switching position due to unexpected events but avoids the driving mode switching position due to ubiquitous events based on the travel route map having the intervention factor information upon determining a travel route that avoids the driving mode switching position cannot be calculated.

9. A vehicle travel route control method realized by using intercommunication among a vehicle dispatch controller for controlling a first plurality of vehicles having an autonomous driving function or a driving assist function, on-board terminals mounted in the first plurality of vehicles, and user terminals, the vehicle travel route control method comprising:

the vehicle dispatch controller disposed externally of the first plurality of vehicles and configured to create a travel route map in which driving mode switching position has been added to a road map at which vehicles switched over during travel to a manual driving mode from an autonomous driving mode that is a driving mode realized by use of the autonomous driving function or the driving assist function of the vehicle, the driving mode switching position being received from a second plurality of vehicles, (a) acquire boarding location and position information of a destination, extracting a dispatch vehicle candidate from among the first plurality of vehicles, and acquiring location information of the dispatch vehicle candidate at the extracted timing, when a dispatch request is received from the user terminal, (b) calculate a route that avoids the driving mode switching position from a plurality of routes on which the dispatch vehicle candidate travels to the destination via the boarding location based on the travel route map when the location information of the dispatch vehicle candidate is acquired, and (c) set the dispatch vehicle candidate for which the travel route could be calculated as a dispatch vehicle when a travel route that avoids the driving mode switching position is calculated, and transmit the travel route information that was calculated to the on-board terminal mounted in the dispatch vehicle upon determining that the calculated travel route avoids the driving mode witching position, upon determining that the calculated travel route for the dispatch vehicle candidate does not avoid the driving mode switching position, repeating steps (a) through (c) for another one of the first plurality of vehicles until the travel route calculated for the dispatch vehicle candidate avoids the driving mode switching position.

10. A vehicle travel route control system that controls a first plurality of vehicles having an autonomous driving function or a driving assist function, the vehicle travel route control system comprising:

a user terminal that sends a dispatch request to a destination;

a vehicle dispatch controller extracts a dispatch vehicle candidate from among the first plurality of vehicles and calculates a travel route for the dispatch vehicle candidate when the dispatch request has been received, the vehicle dispatch controller being disposed externally of the first plurality of vehicles;

a control operator operating device that includes a dispatch management monitor that presents a travel route of the dispatch vehicle candidate calculated in the vehicle dispatch controller on a monitor screen and a remote control unit that creates or corrects travel route information by using a remote control input based on a determination of a control operator; and an on-board terminal mounted in each of the first plurality of vehicles and receives the travel route information from the control operator operating device, wherein the vehicle dispatch controller is configured to create a travel route map, in which information regarding a driving mode switching position at which vehicles during travel have switched over to a manual driving mode from an autonomous driving mode that is a driving mode realized by use of the autonomous driving function or the driving assist function of the vehicle, have been added to a road map, the information regarding the driving mode switching position being received from a second plurality of vehicles, and (a) calculate a travel route that avoids the driving mode switching position from among a plurality of routes on which the dispatch vehicle candidate travels to the destination via a boarding location based on the travel route map and position information of the dispatch vehicle candidate at the extracted timing, and (b) in the case that a travel route that avoids the driving mode switching position is presented on the monitor screen, if a permission operation is input to the remote control unit, the control operator operating device sets the dispatch vehicle candidate in accordance with the presented route as a dispatch vehicle, and transmits the route that was presented to the on-board terminal mounted in the dispatch vehicle as the travel route information, upon determining that the calculated travel route for the dispatch vehicle candidate does not avoid the driving mode switching position, repeating steps (a) and (b) for another one of the first plurality of vehicles until the travel route calculated for the dispatch vehicle candidate avoids the driving mode switching position.

11. The vehicle travel route control system according to claim 10, wherein in the case that a travel route that avoids the driving mode switching position is presented on the monitor screen, if an operation to correct a presented route is input to the remote control unit, the control operator operating device sets the dispatch vehicle candidate in accordance with the presented route as a dispatch vehicle, and transmits the corrected travel route to the on-board terminal mounted in the dispatch vehicle as the travel route information.

12. The vehicle travel route control system according to claim 10, wherein in the case that a plurality of travel routes that avoid the driving mode switching position are presented on the monitor screen, if a selection operation for selecting one route from a plurality of presented routes is input to the remote control unit, the control operator operating device sets a dispatch vehicle candidate in accordance with the presented route that was selected as the dispatch vehicle, and transmits the presented route that was selected to the on-board terminal mounted in the dispatch vehicle as the travel route information.

13. The vehicle travel route control system according to claim 10, wherein in the case that the monitor screen displays that a travel route that avoids the driving mode switching position does not exist, if a boarding location changing operation for changing the boarding location is input to the remote control unit, the control operator operating device creates a corrected route for the dispatch vehicle candidate that avoids the driving mode switching position via the changed boarding location.

14. The vehicle travel route control system according to claim 10, wherein when the driving mode switching position are registered in the travel route map, after an arbitrary period of time has elapsed since the registration, the vehicle dispatch controller deletes information regarding the driving mode switching position from the travel route map.

15. The vehicle travel route control system according to claim 10, wherein when the driving mode switching position are registered in the travel route map, the vehicle dispatch controller counts the number of vehicles that have passed the registered driving mode switching position while in the autonomous driving mode, and when the count exceeds a prescribed threshold value, deletes the information regarding the driving mode switching position from the travel route map.

16. The vehicle travel route control system according to claim 10, wherein when a deletion operation for deleting the driving mode switching position is input to the remote control unit, the vehicle dispatch controller deletes the information regarding the driving mode switching position to be deleted from the travel route map.

17. The vehicle travel route control system according to claim 10, wherein the vehicle dispatch controller also has vehicle orientation information as information related to the driving mode switching position provided in the travel route map.

18. The vehicle travel route control system according to claim 10, wherein in the case that there are unmanned vehicles and manned vehicles as the dispatch vehicle candidates, when both of the two types of vehicles can be dispatched with respect to the dispatch request, and when there are no driving mode switching position on the travel route, the control operator operating device preferentially dispatches the unmanned vehicle.

19. The vehicle travel route control device according to claim 10, wherein when there are unmanned vehicles and manned vehicles as the dispatch vehicle candidates, when both of the two types of vehicles can be dispatched in response to the dispatch request, and when the travel route contains driving mode switching position, the control operator operating device preferentially dispatches the manned vehicle.

20. A vehicle travel route control device that controls a first plurality of vehicles having an autonomous driving function or a driving assist function, the vehicle travel route control device comprising:

an electronic controller disposed externally of the first plurality of vehicles, the electronic controller including
a vehicle information database that stores information regarding driving mode switching position at which vehicles during travel switched over to a manual driving mode from an autonomous driving mode that is a driving mode realized by use of the autonomous driving function or the driving assist function of the vehicle, the information regarding the driving mode switching position being received from a second plurality of vehicles;
a travel route map creation unit that creates a travel route map in which the driving mode switching position have been added to a road map based on the vehicle information database;
a position information acquisition unit that acquires a boarding location and position information of the destination, that extracts a dispatch vehicle candidate from among the first plurality of vehicles, and that acquires location information of the dispatch vehicle candidate at an extracted timing when a dispatch request is received; and
a travel route calculation unit that calculates a route that avoids driving mode switching position from among a plurality of routes on which the dispatch vehicle candidate travels to the destination via the boarding location based on the travel route map and the position information of the dispatch vehicle candidate;

upon determining that the calculated travel route for the dispatch vehicle candidate does not avoid the driving mode switching position,
the position information acquisition unit extracts another dispatch vehicle candidate from among the first plurality of vehicles and that acquires information of the another dispatch vehicle candidate at the extracted timing when the dispatch request is received; and the travel route calculation unit calculates a route that avoids the driving mode switching position from among a plurality of routes on which the another dispatch vehicle candidate travels to the destination via the boarding location based on the travel route map and the position information of the another dispatch vehicle candidate;

a dispatch management monitor that presents the travel route that was calculated on a monitor screen when a travel route that avoids the driving mode switching position is calculated, the dispatch management monitor including the monitor screen; and the electronic controller further including a remote control unit that inputs a remote control by a control operator that monitors the monitor screen when the travel route is presented on the monitor screen; and a communication unit that sets the dispatch vehicle candidate or the another dispatch vehicle candidate that travels on the created or corrected route as a dispatch vehicle, and transmits the created or corrected route to the on-board terminal mounted in the dispatch vehicle as the travel route information, when the travel route is created or corrected by using the remote control input.

21. A vehicle travel route control method carried out by using mutual communication between a vehicle dispatch controller for controlling a first plurality of vehicles having an autonomous driving function or a driving assist function, a control operator operating device that has a dispatch management monitor and a remote control unit, on-board terminals mounted in the first plurality of vehicles, and user terminals, the vehicle travel route control method comprising:

creating a travel route map in which a driving mode switching position has been added to a road map at which vehicles during travel switched over to manual driving mode from autonomous driving mode, that is, the driving mode realized by use of an autonomous driving function or a driving assist function of a vehicle, information regarding the driving mode switching position being received from a second plurality of vehicles, (a) acquiring boarding location and position information of a destination, extracting a dispatch vehicle candidate from among the first plurality of vehicles, and acquiring location information of the dispatch vehicle candidate at the extracted timing when a dispatch request is received from the user terminal, (b) calculating a route that avoids the driving mode switching position from among a plurality of routes on which the dispatch vehicle candidate travels to the destination via a boarding location based on the travel route map and position information of the dispatch vehicle candidate, (c) presenting the travel route that was the calculated on a monitor screen of the dispatch management monitor when the travel route that avoids the driving mode switching position is calculated, (d) creating or correcting the travel route by using a remote control input to the remote control unit when the travel route is presented on the monitor screen, and (e) setting the dispatch vehicle candidate that travels on the created or corrected route as a dispatch vehicle and transmitting the travel route information to the on-board terminal mounted in the dispatch vehicle when the travel route is created or corrected, upon determining that the calculated travel route for the dispatch vehicle candidate does not avoid the driving mode switching position, repeating steps (a) through (e) for another one of the plurality of dispatch vehicle candidates until the travel route calculated for the dispatch vehicle candidate avoids the driving mode switching position, the vehicle dispatch controller being disposed externally of the first plurality of vehicles.

* * * * *